(12) United States Patent
Stankoulov

(10) Patent No.: US 10,942,735 B2
(45) Date of Patent: Mar. 9, 2021

(54) DISTRIBUTED CROSS-PLATFORM USER INTERFACE AND APPLICATION PROJECTION

(71) Applicant: Abalta Technologies, Inc., Torrance, CA (US)

(72) Inventor: Pavel Stankoulov, San Diego, CA (US)

(73) Assignee: Abalta Technologies, Inc., San Diego, CA (US)

(*) Notice: Subject to any disclaimer, the term of this patent is extended or adjusted under 35 U.S.C. 154(b) by 68 days.

(21) Appl. No.: 14/042,365

(22) Filed: Sep. 30, 2013

(65) Prior Publication Data

US 2014/0156734 A1 Jun. 5, 2014

Related U.S. Application Data

(60) Provisional application No. 61/733,367, filed on Dec. 4, 2012.

(51) Int. Cl.
*G06F 15/16* (2006.01)
*G06F 9/00* (2006.01)
(Continued)

(52) U.S. Cl.
CPC ............... *G06F 9/00* (2013.01); *H04L 65/00* (2013.01); *H04L 65/1069* (2013.01);
(Continued)

(58) Field of Classification Search
CPC ........... H04N 1/00198; H04N 21/4104; H04N 7/163; H04N 5/44543; H04N 21/4312;
(Continued)

(56) References Cited

U.S. PATENT DOCUMENTS

| 7,339,493 B2 * | 3/2008 | El Zabadani | A61B 5/0062 |
| | | | 340/12.5 |
| 7,624,210 B2 | 11/2009 | Izutsu | |

(Continued)

FOREIGN PATENT DOCUMENTS

| JP | 2009260818 A | 11/2009 |
| JP | 2011176591 A | 2/2010 |

(Continued)

*Primary Examiner* — Dustin Nguyen
(74) *Attorney, Agent, or Firm* — Genius Patent APC; Bruce Angus Hare

(57) ABSTRACT

A mobile device application adapted to provide multimedia content to a target canvas is described. The application includes sets of instructions for: establishing a communication link with an external system associated with the target canvas; rendering multimedia content for playback by the target canvas; and sending the rendered multimedia content to the target canvas over the communication link. A mobile device application adapted to execute web-based applications in a browser associated with an external system includes sets of instructions for: establishing a communication link with the external system; accessing a web-based application; and rendering content associated with the application and sending the rendered content to the external system for display in the browser. A system adapted to provide multimedia content includes: a target adapted to display multimedia content; a host adapted to generate multimedia content; and a remote server adapted to at least partially control the display of multimedia content.

20 Claims, 16 Drawing Sheets

(51) Int. Cl.
*H04M 1/725* (2021.01)
*H04N 21/41* (2011.01)
*H04L 29/06* (2006.01)
*H04N 21/462* (2011.01)
*H04N 21/4402* (2011.01)
*H04L 29/08* (2006.01)
*H04W 4/00* (2018.01)
*H04N 21/414* (2011.01)

(52) U.S. Cl.
CPC ........ *H04L 65/4084* (2013.01); *H04L 65/602* (2013.01); *H04M 1/7253* (2013.01); *H04N 21/4122* (2013.01); *H04N 21/4126* (2013.01); *H04N 21/4402* (2013.01); *H04N 21/4621* (2013.01); *H04L 67/02* (2013.01); *H04N 21/41422* (2013.01); *H04W 4/00* (2013.01)

(58) Field of Classification Search
CPC ............ H04N 21/4122; H04N 21/4227; G06F 17/30905; G06F 3/1454; G06F 17/30899; G06F 3/04883; G06F 9/4445; G06F 3/017; G06F 3/1446; G06F 3/1432; G06F 3/1462; G06F 3/14; G06F 3/038; G06F 3/1431; G06F 9/452; A61B 5/0062; A63F 13/12; A63F 13/06; G06Q 10/10; H04L 12/2807; H04L 65/80; H04L 67/104; H04L 12/1859; H04L 67/02; H04W 12/08; G06T 9/001; G06T 9/004; G04N 9/3147; G04N 19/503
USPC ........ 709/203, 213, 232; 455/3.06; 345/634, 345/173; 715/751, 769, 772; 725/80; 370/338
See application file for complete search history.

(56) References Cited

U.S. PATENT DOCUMENTS

| | | | | |
|---|---|---|---|---|
| 7,747,086 | B1* | 6/2010 | Hobbs | G06T 9/004 382/232 |
| 8,005,053 | B2 | 8/2011 | Schmidt | |
| 8,766,993 | B1* | 7/2014 | Hobbs | G06F 3/14 345/536 |
| 9,392,315 | B1* | 7/2016 | Lang | H04N 21/4122 |
| 9,451,319 | B2 | 9/2016 | Maitre et al. | |
| 10,237,327 | B2* | 3/2019 | Kominac | H04L 67/02 |
| 2004/0010622 | A1* | 1/2004 | O'Neill | G06T 9/001 709/247 |
| 2004/0183756 | A1* | 9/2004 | Freitas | H04N 5/44543 345/73 |
| 2004/0221230 | A1* | 11/2004 | Kakemura | G06F 3/1462 715/273 |
| 2004/0222983 | A1* | 11/2004 | Kakemura | G06F 3/1431 345/204 |
| 2005/0198353 | A1* | 9/2005 | Zmrzli | G06F 17/30899 709/232 |
| 2005/0234864 | A1* | 10/2005 | Shapiro | H04L 67/104 |
| 2006/0212621 | A1* | 9/2006 | Ash | H04N 7/163 710/62 |
| 2006/0250389 | A1 | 11/2006 | Gorelenkov | |
| 2006/0282855 | A1* | 12/2006 | Margulis | G06F 3/1431 725/43 |
| 2007/0146347 | A1* | 6/2007 | Rosenberg | G06F 3/04883 345/173 |
| 2008/0165045 | A1* | 7/2008 | Cvetanovic | H04L 12/1859 341/176 |
| 2008/0201751 | A1* | 8/2008 | Ahmed | H04N 21/4312 725/109 |
| 2008/0205389 | A1* | 8/2008 | Fang | H04L 65/80 370/389 |
| 2009/0022120 | A1* | 1/2009 | Buer | H04W 12/08 370/338 |
| 2010/0031299 | A1* | 2/2010 | Harrang | H04N 21/4104 725/80 |
| 2010/0259491 | A1 | 10/2010 | Rajamani et al. | |
| 2010/0306413 | A1* | 12/2010 | Kamay | H04N 19/503 709/247 |
| 2011/0093805 | A1* | 4/2011 | Ekhager | G06Q 10/10 715/769 |
| 2011/0131520 | A1* | 6/2011 | Al-Shaykh | H04L 12/2807 715/772 |
| 2011/0199389 | A1* | 8/2011 | Lu | G06F 3/017 345/619 |
| 2011/0210983 | A1* | 9/2011 | Theimer | H04N 1/00198 345/634 |
| 2011/0234896 | A1* | 9/2011 | Ivashin | H04N 9/3147 348/445 |
| 2011/0271195 | A1 | 11/2011 | Bose et al. | |
| 2012/0038679 | A1 | 2/2012 | Yun et al. | |
| 2012/0042252 | A1* | 2/2012 | Neerudu, Sr. | G06F 3/1454 715/733 |
| 2012/0069131 | A1 | 3/2012 | Abelow | |
| 2012/0077586 | A1* | 3/2012 | Pishevar | A63F 13/06 463/31 |
| 2012/0079551 | A1 | 4/2012 | Isozaki et al. | |
| 2012/0081353 | A1 | 4/2012 | Yusupov et al. | |
| 2012/0084713 | A1* | 4/2012 | Desai | G06F 9/452 715/788 |
| 2012/0092277 | A1* | 4/2012 | Momchilov | G06F 3/038 345/173 |
| 2012/0117145 | A1* | 5/2012 | Clift | G06F 9/4445 709/203 |
| 2012/0172088 | A1 | 7/2012 | Kirch et al. | |
| 2012/0319927 | A1* | 12/2012 | Khatib | G06F 3/1446 345/2.1 |
| 2014/0040767 | A1* | 2/2014 | Bolia | G06F 3/1454 715/751 |
| 2014/0094112 | A1* | 4/2014 | Agnihotri | H04H 40/00 455/3.06 |
| 2014/0108585 | A1* | 4/2014 | Barton | G06F 17/30905 709/213 |
| 2014/0310599 | A1* | 10/2014 | Clift | H04N 21/4227 715/719 |

FOREIGN PATENT DOCUMENTS

| | | |
|---|---|---|
| JP | 2011176591 A | 9/2011 |
| JP | 2012074771 A | 4/2012 |

\* cited by examiner

DISTRIBUTED CROSS-PLATFORM USER INTERFACE AND APPLICATION PROJECTION

CROSS-REFERENCE TO RELATED APPLICATIONS

This application claims priority to U.S. Provisional Patent Application Ser. No. 61/733,367, filed on Dec. 4, 2012.

BACKGROUND OF THE INVENTION

Mobile devices (e.g., smartphones, tablet devices, laptop PCs, etc.) that are able to access one or more networks (e.g., a cellular network, a local area wireless network, the Internet, etc.) are ubiquitous in society. Such devices may be capable of processing, displaying, and/or otherwise interacting with multimedia elements (e.g., video, photo, audio, etc.) utilizing various local and/or web-based applications.

Many typical systems and/or devices (e.g., in-vehicle systems including display screens, medical systems, televisions (TVs), etc.) may be capable of processing, presenting, and/or otherwise interacting with multimedia elements. Such devices may not have access to external networks. For instance, a head unit (HU) multimedia element may be able to display multimedia elements such as video from a local source (e.g., a DVD player connected to the HU). In addition, in cases where such an element is able to access an external network, the access may be limited by the software available to the local element (e.g., even an element that may be able to access a network to retrieve, for instance, map data, may not be able to provide a web browser).

Such systems and/or devices may include limited processing capability (especially as compared to a mobile device). Furthermore, these systems and/or devices may execute device-specific software that may not be updated as frequently (or as easily) as software updates are made available for a typical mobile device. Likewise, upgrading such systems or devices may be impractical or impossible due to limitations imposed by a physical housing, available power sources, communications connections, etc.

Therefore there exists a need for a solution that is able to provide an easily updated or upgraded approach that utilizes the processing power of mobile devices to provide extended and improved network access, functionality and multimedia performance to existing systems.

BRIEF SUMMARY OF THE INVENTION

Some embodiments allow external systems or devices connected to host devices such as smartphones to easily run third party applications developed using various appropriate web technologies (e.g., HTML5, a scripting language such as JavaScript, cascading style sheets (CSS), etc.) and/or native mobile technologies (e.g., Objective-C, Java, C #, etc.). Such external systems or devices may include, for example, in-vehicle head-unit (HU) devices, medical devices, TVs, etc. Some embodiments allow these external systems or devices to be kept simple, low cost and be extensible using third party applications.

Some embodiments include a set of components that are built on top of core mobile communication stack (or "gateway" or "interface") transport and HTTP layers. The performance and the flexibility of the gateway may be utilized and extended it with configurable infrastructure that allows downloading, managing and serving applications to connected target (or "client") elements. Some embodiments may be configured to support different application delivery and rendering options—from delivering HTML code directly to the target, to rendering on the host and delivering rendered screens to the target. Such an approach accommodates different devices having different capabilities. Some embodiments provide a common programming interface and infrastructure that allows developers to generate applications that are able to be executed using different targets.

The solution of some embodiments may be extensible (new components and features may be added without changing the main architecture), configurable (the components may be easily setup for different configurations), operating system (OS) independent (may run on all major operating systems), bandwidth efficient (the solution may utilize compression, encoding, and/or other appropriate techniques to minimize bandwidth usage), and responsive (the solution may use efficient protocols to create a seamless user experience on the client device). In addition, the solution may allow application portability, where applications written for one operating system may run on another or on a client with minimal change.

A first exemplary embodiment of the invention provides a mobile device application adapted to provide multimedia content to a target canvas. The application includes sets of instructions for: establishing a communication link with an external system associated with the target canvas; rendering multimedia content for playback by the target canvas; and sending the rendered multimedia content to the target canvas over the communication link.

A second exemplary embodiment of the invention provides a mobile device application adapted to execute web-based applications in a web browser associated with an external system. The application includes sets of instructions for: establishing a communication link with the external system; accessing a particular web-based application; and rendering content associated with the particular web-based application and sending the rendered content to the external system for display.

A third exemplary embodiment of the invention provides a system adapted to provide multimedia content to a user. The system includes: a target adapted to display multimedia content; a host adapted to generate multimedia content for display by the target; and a remote server adapted to interact with the host to at least partially control the display of multimedia content.

The preceding Summary is intended to serve as a brief introduction to various features of some exemplary embodiments of the invention. Other embodiments may be implemented in other specific forms without departing from the spirit of the invention.

BRIEF DESCRIPTION OF THE SEVERAL VIEWS OF THE DRAWINGS

The novel features of the invention are set forth in the appended claims. However, for purpose of explanation, several embodiments of the invention are set forth in the following drawings.

DETAILED DESCRIPTION OF THE INVENTION

Figure 1:
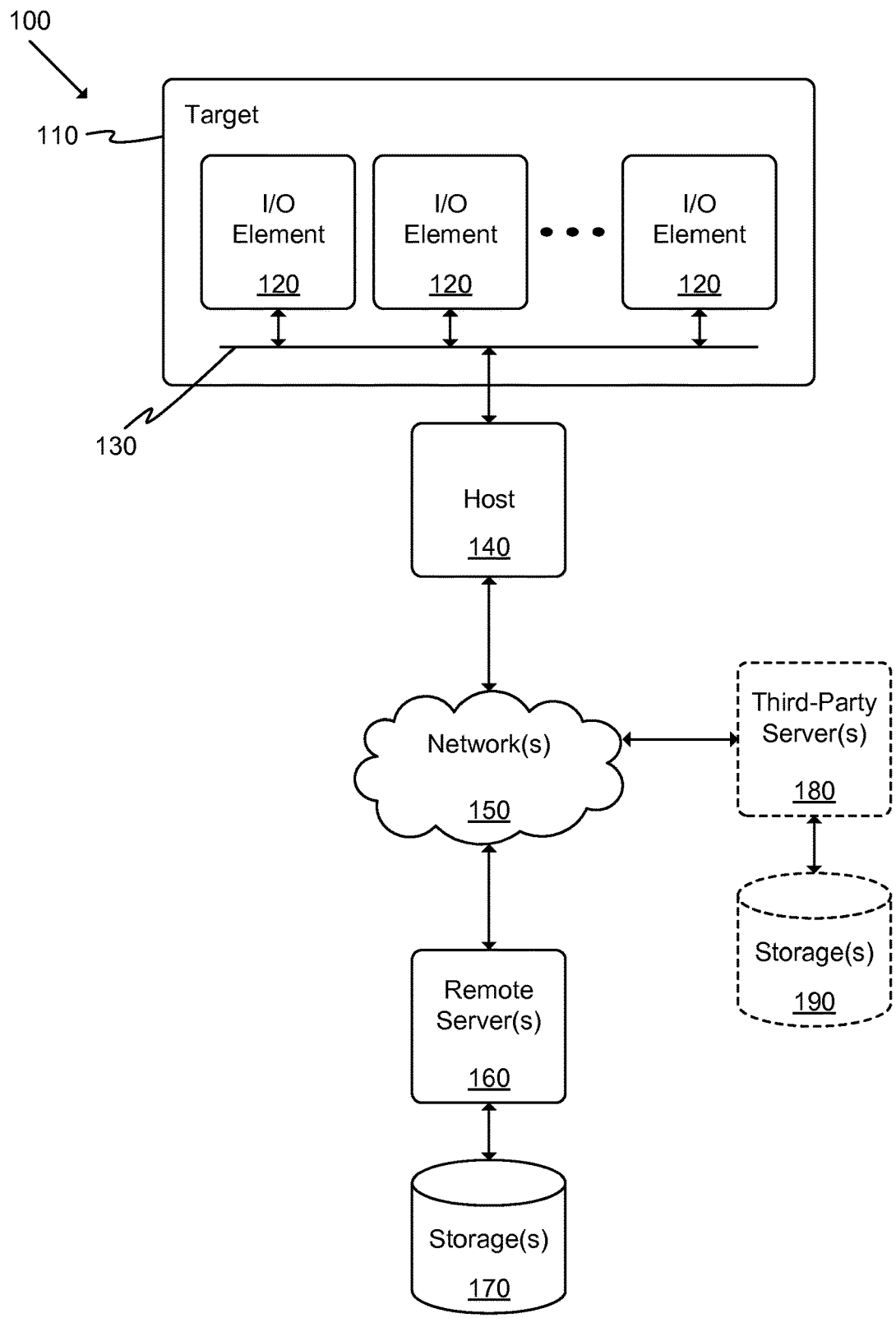
FIG. 1 illustrates a schematic block diagram of a conceptual system of some embodiments.

The following detailed description is of the best currently contemplated modes of carrying out exemplary embodiments of the invention. The description is not to be taken in a limiting sense, but is made merely for the purpose of illustrating the general principles of the invention, as the scope of the invention is best defined by the appended claims.

Various inventive features are described below that can each be used independently of one another or in combination with other features.

Broadly, embodiments of the present invention generally provide a set of server, host elements (e.g., smartphones, tablet devices, etc.) and target elements (e.g., vehicle head units, TVs, medical devices, etc.) that can be used and configured in various appropriate ways. Such components will be described in more detail in Section I below.

In a first configuration, some embodiments may use one or more target elements to host a web browser. Such an approach may allow web application to be stored locally by the target elements (or "client"), allowing the applications to be used even without any network connectivity. In addition, such a configuration may allow for fast response as the applications are local and may thus be rendered quickly. This approach may require the target element to have relatively powerful hardware in order to render the applications. In addition, any browser used by the target device may have to be updated regularly to maintain compatibility with evolving technology. In some cases (e.g., vehicle head units) appropriate updates may not be available to the target device and/or may not be able to be installed easily by a user.

In a second configuration, a mobile device may host and render an application and the target element may act as a screen projection client. Such rendering may be performed off-screen by the mobile device using the screen resolution of the client device. Such an approach allows for a simple, cheap and easy to maintain target device because the mobile device provides most of the required processing power. In addition, updates to mobile device browser software may be provided regularly and may be installed easily (or may be updated automatically). This approach may also allow standard technologies such as virtual network computing (VNC), standard video encoding formats, etc. to be used. In some cases, this configuration may have a slower response as projection screens (and/or other appropriate data) may be sent over a potentially slower link (e.g., an in-vehicle communications bus).

In a third configuration, a mobile device may similarly host an application, but may prepare and send data in vector format to the target element, which may act as a screen projection client. The client may maintain a cache of common resources, thus allowing for improved rendering and reduced traffic among the mobile device and the client device, providing improved performance. Such an approach allows for a relatively simple, cheap and easy to maintain target device because the mobile device provides most of the required processing power. In addition, updates to mobile device browser software may be provided regularly and may be installed easily (or may be updated automatically).

Although the various configurations have been separated logically for simplicity, one of ordinary skill in the art will recognize that the various configurations (or "modes") may be combined to provide support of multiple modes. Thus, depending on the capabilities of the host and/or target, the host may send full screens or vector commands, as appropriate. In addition, other technologies, such as screencast technologies, may also be used in place of VNC or the vector approach described above.

Another implementation may allow smartphone applications to use native controls with or without a web view. The host may prepare an off-screen buffer with the size and resolution of the client and use the buffer to render the user interface (UI) and simulate the user input events to the interface.

Several more detailed embodiments of the invention are described in the sections below. Section I provides a conceptual description of the hardware architecture of some embodiments. Section II then describes a conceptual software architecture of some embodiments. Next, Section III provides a conceptual description of application and policy management provided by some embodiments. Section IV then describes various algorithms used by some embodiments. Section V follows with a description of a conceptual computer system which implements some of the embodiments of the invention.

I. Hardware Architecture

Sub-section I.A provides a conceptual description of a system of some embodiments. Sub-section I.B then describes a conceptual control element of some embodiments. Lastly, sub-section I.C describes a conceptual target element of some embodiments.

A. System

FIG. 1 illustrates a schematic block diagram of a conceptual system 100 of some embodiments. Specifically, this figure shows the various communication pathways among the system elements. As shown, the system may include a target system or device 110 which may include one or more input/output (I/O) elements 120 and a communication bus 130, one or more host systems or devices 140, one or more networks 150, a set of remote servers 160 with associated storage(s) 170, and a set of third-party servers 180 with associated storage(s) 190.

Target element 110 may be any set of systems, devices, components, and/or other appropriate elements that may be able to communicate with a host element 140. Each of the I/O elements 120 may include various appropriate components (e.g., a display screen, an audio output, a set of user controls, a touchscreen, etc.) and/or capabilities (e.g., encoding or decoding of audio video and/or other multimedia, communicating across one or more networks, etc.). The term "target" may be used throughout to indicate a target element or set of I/O elements, as appropriate. The communication bus 130 may include various hardware and/or software elements, as appropriate. Such a bus may be wired or wireless and may allow various components of the target element 110, the host element 140, and/or other components to communicate.

In some embodiments, the target element 110 may be a vehicle (e.g., a car, airplane, bus, train, recreational vehicle (RV), etc.). Such a system may include I/O elements 120 such as head units, monitors, TVs, video screens, audio elements (e.g., speakers, headphone jacks, etc.), user interfaces (e.g., control buttons, touchscreens, microphones, etc.), audio players (e.g., a stereo system), and/or other appropriate elements.

Each host element 140 may be an electronic system or device that is cable of interacting with the target 110 (e.g., a smartphone, a tablet device, a notebook computer, a dedicated media player, etc.). The host 140 may interact with one or more I/O elements 120 included in the target system 110, as appropriate. For instance, in some embodiments a smartphone host 140 may send multimedia content to multiple vehicle head unit I/O elements 120. In addition, as described below in reference to FIG. 2, system 100 may include multiple targets 110 and/or hosts 140, as appropriate.

The network 150 may include one or more communication networks accessible to the host 140 (and/or the target 110). Such networks may include, for instance, cellular communication networks, wireless networks, wired networks, networks of networks (e.g., the Internet), and/or other appropriate networks. Such networks may be accessed using various appropriate combinations of hardware and/or software elements, as appropriate.

The remote server 160 may include one or more devices that are able to access the network 150 and thus communicate with the host 140. Storage 170 may include one or more devices accessible to the remote server 160 that are able to store data and/or instructions. In some embodiments, the remote server 160 may execute software that is adapted to communicate with associated software executed by the host 140, target 110, and/or other appropriate elements.

The third-party server 180 may include one or more devices that are able to access the network 150 and thus communicate with the host 140. Storage 190 may include one or more devices accessible to the third-party server 180 that are able to store data and/or instructions. In some embodiments, the third-party server and/or storages 190 may be accessed using one or more APIs.

One of ordinary skill in the art will recognize that system 100 is conceptual in nature and may be implemented in various different ways without departing from the spirit of the invention. For instance, different embodiments may include different specific components and/or communication pathways among components. As another example, some embodiments may include addition components or fewer components than shown (e.g., some embodiments may operate without access to any networks or servers).

Figure 2:
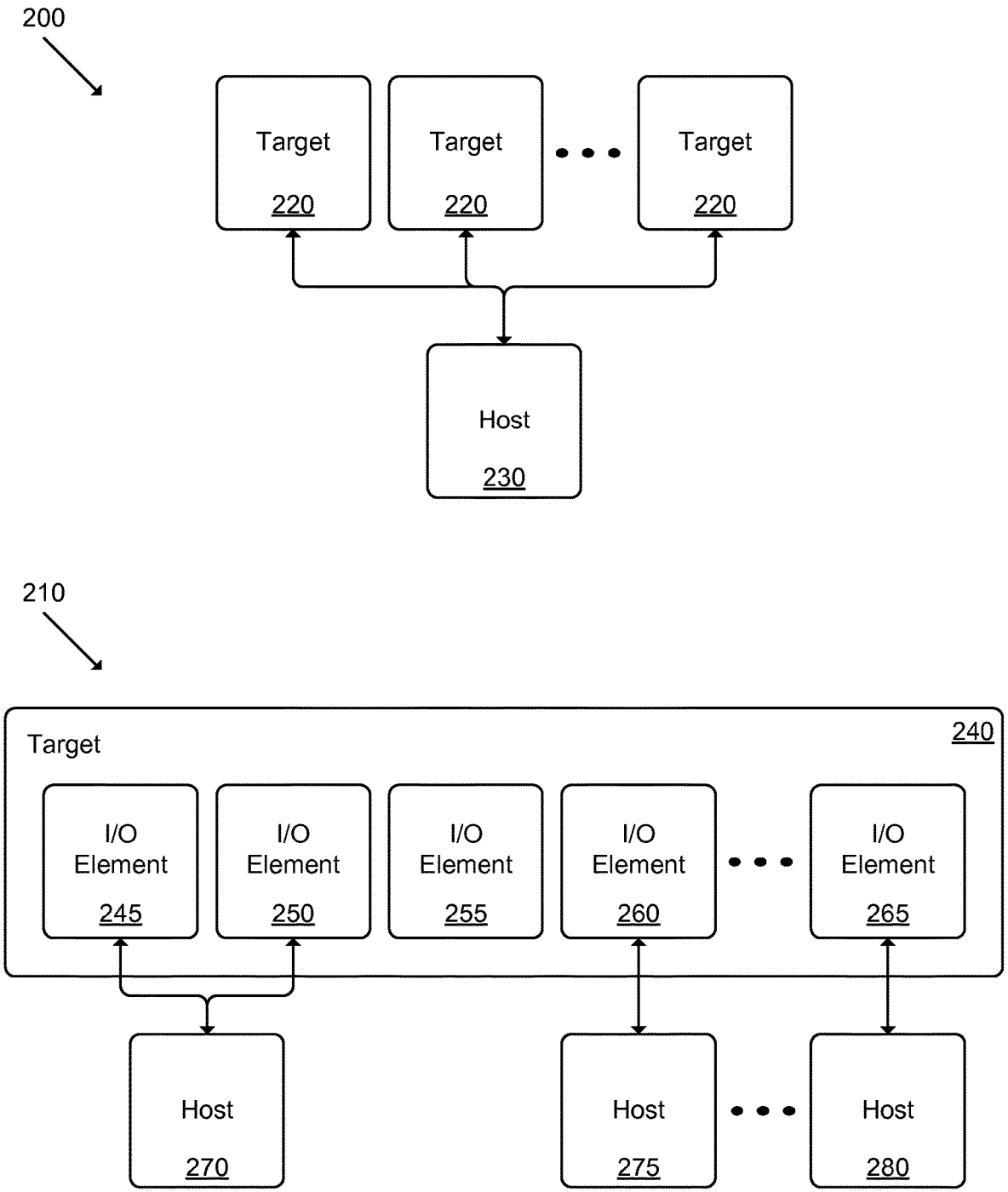
FIG. 2 illustrates a schematic block diagram of connection schemes that may be used by some embodiments of the system.

FIG. 2 illustrates a schematic block diagram of example connection schemes 200-210 that may be used by some embodiments of the system 100. Specifically, this figure shows multiple-target and multiple-host configurations that may be used.

As shown, a first example configuration 200 may include multiple targets 220 communicating with a single host 230. Such a configuration may be used, for example, to stream media from a smartphone to multiple TVs.

In a second example configuration 210 may include a target 240 with multiple I/O elements 245-265 and multiple hosts 270-280. In this example, a first host 270 may interact with multiple I/O elements 245-250 (e.g., by sending multimedia content to multiple vehicle head units and/or displays). Another I/O element 255 may not interact with any host (e.g., when the I/O element is running a native application such as a navigation application in a vehicle). A second host 275 may interact with a single I/O element 260. Additional hosts 280 and/or I/O elements 265 may each be configured in various appropriate ways (e.g., one host associated with one I/O element, one host associated with multiple I/O elements, an I/O element with no associated host, etc.).

In addition to the examples shown in FIG. 2, one of ordinary skill in the art will recognize that various other appropriate schemes may be used, as appropriate. For instance, multiple hosts may interact with multiple targets, where each target may include multiple distinct I/O elements that are each able to interact (or not) with one of the hosts. As another example, in some embodiments multiple hosts may interact with each I/O element (e.g., a first host may transmit video data to a set of I/O elements and a second host may transmit audio data to another, overlapping, set of I/O elements).

B. Host

Figure 3:
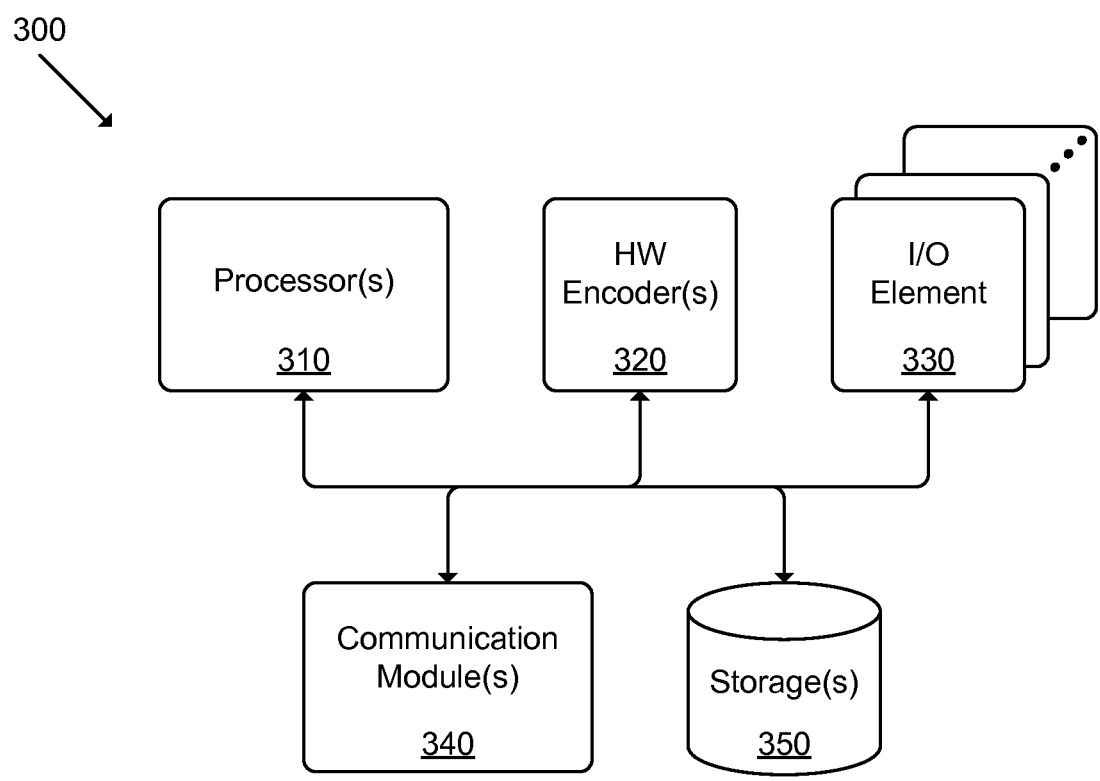
FIG. 3 illustrates a schematic block diagram of a host element of some embodiments.

FIG. 3 illustrates a schematic block diagram of a host element 300 of some embodiments. Specifically, this figure shows various conceptual sub-elements and communication pathways that may be used by the host. As shown, the host system or device 300 may include one or more processors 310, one or more hardware encoders 320, a set of I/O elements 330, one or more communication modules 340, and one or more storages 350. Examples of such host elements include mobile phones, smartphones, PCs, tablet devices, dedicated media players (e.g., DVD players, Blu-ray players, CD players, mp3 players, etc.), and/or other appropriate sets of components.

Each processor 310 may be able to perform various operations using sets of data and/or instructions. Each hardware encoder 320 may be specifically adapted to process certain types of inputs (e.g., video input from a camera, audio input from a microphone, etc.) and generate data in an appropriate format for use by another multimedia element. Each I/O element 330 may be adapted to receive input from a user and/or provide output to a user (e.g., a touchscreen, keypad, mouse and/or other cursor control device, display screen, speaker, microphone, etc.). Each communication module 340 may be adapted to communicate with one or more other systems and/or devices across various available pathways (e.g., wired connections, wireless connections, network connections, etc.) using various appropriate protocols (e.g., Bluetooth, IEEE 802.11, etc.). Each storage 350 may be adapted to store data and/or instructions. The various components 310-350 may be able to communicate amongst each other using various local pathways such as busses, networks, etc.

Although the host 300 may conceptually be considered as a single system or device, in some embodiments the host may include various combinations of distinct elements (e.g., a smartphone with external microphone/headphones, a tablet device with external speakers, etc.). Such components may be connected using various physical elements (e.g., cables, connectors, receptacles, etc.) and/or wireless or virtual elements.

The host of some embodiments may include various UI elements (e.g., touch screens, buttons, keypads, etc.) that may be utilized in various appropriate ways. For instance, some embodiments may allow a user to at least partially control a target element using various input elements provided by the host (e.g., control features on a touchscreen, volume control buttons, etc.). In addition, a component such as a display element (e.g., a touchscreen, an indicator light, etc.) may be used to provide information to a user.

One of ordinary skill in the art will recognize that host 300 is conceptual in nature and may be implemented in various different ways without departing from the spirit of the invention. For instance, different embodiments may include different specific components and/or communication pathways among components. As another example, some embodiments may include addition components or fewer components than shown (e.g., some embodiments may not include hardware encoders).

C. Target

Figure 4:
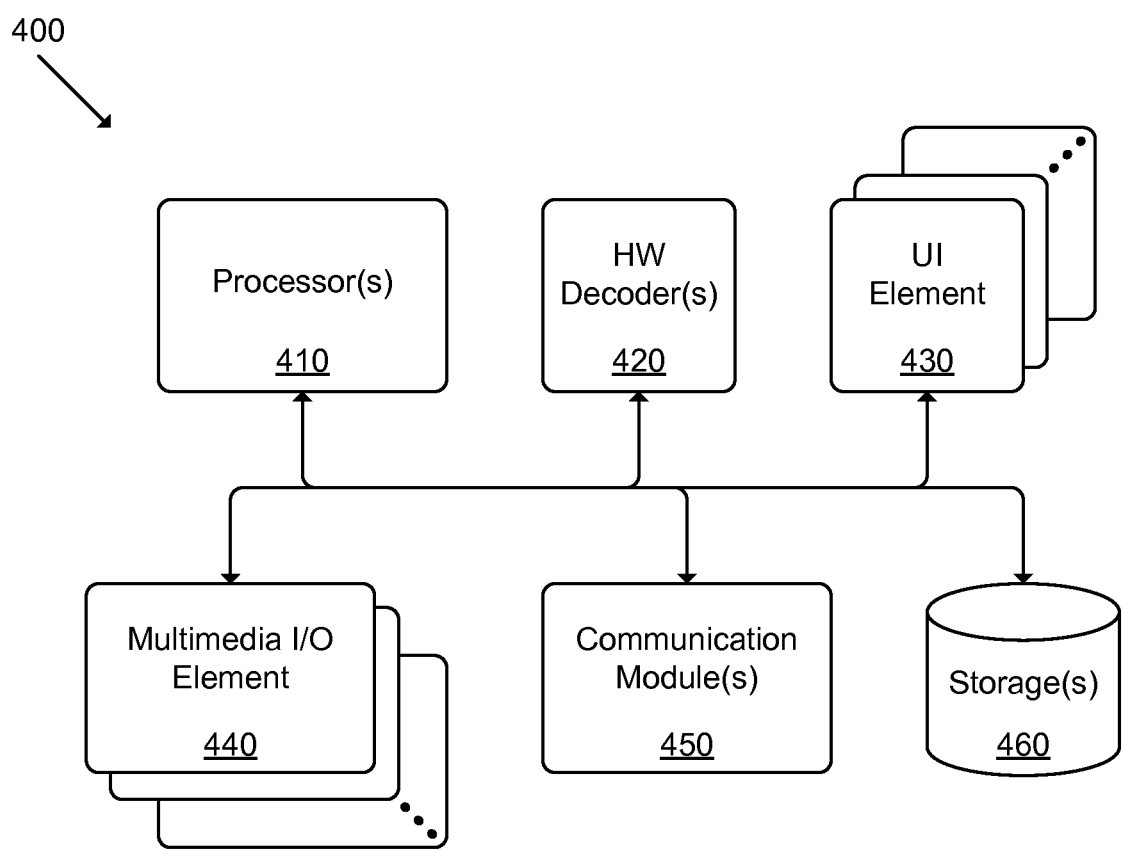
FIG. 4 illustrates a schematic block diagram of a target element of some embodiments.

FIG. 4 illustrates a schematic block diagram of a target element 400 of some embodiments. Specifically, this figure shows various conceptual sub-elements and communication pathways that may be used by the target. As shown, the target system or device 400 may include one or more processors 410, one or more hardware decoders 420, a set of UI elements 430, a set of multimedia I/O elements 440, one or more communication modules 450, and one or more storages 360. Examples of such target elements include TVs, vehicle HUs, display monitors, smartphones, PCs, tablet devices, and/or other appropriate sets of components.

Each processor 410 may be able to perform various operations using sets of data and/or instructions. Each hardware decoder 420 may be specifically adapted to process certain types of received data (e.g., video, audio, etc.) and generate appropriate outputs that are optimized for various media presentation elements (e.g., display screens, audio outputs, etc.). Each UI element 430 may be adapted to receive inputs from and/or send outputs to a user (e.g., a touchscreen, keypad, buttons, knobs, mouse and/or other cursor control device, display screen, speaker, microphone, etc.). Each multimedia I/O element 440 may be adapted to provide multimedia content to a user (e.g., a video screen, a set of speakers, etc.). Each communication module 450 may be adapted to communicate with one or more other systems and/or devices across various available pathways (e.g., wired connections, wireless connections, network connections, etc.) using various appropriate protocols (e.g., Bluetooth, IEEE 802.11, etc.). Each storage 460 may be adapted to store data and/or instructions. The various components 410-460 may be able to communicate amongst each other using various local pathways such as busses (e.g., a controller area network (CAN) bus), networks, etc.

Although the target 400 may conceptually be considered as a single system or device, in some embodiments the target may include various combinations of distinct elements (e.g., a display screen with a headphone jack, a tablet device with external speakers, etc.). Such components may be connected using various physical elements (e.g., cables, connectors, receptacles, etc.) and/or wireless or virtual elements.

One of ordinary skill in the art will recognize that target 400 is conceptual in nature and may be implemented in various different ways without departing from the spirit of the invention. For instance, different embodiments may include different specific components and/or communication pathways among components. As another example, some embodiments may include addition components or fewer components than shown (e.g., some embodiments may not include hardware decoders).

II. Software Architecture

Sub-section II.A provides a conceptual description of a browser-based configuration of some embodiments. Sub-section II.B then describes a screen projection implementation of some embodiments. Next, sub-section II.C describes vector screen projection implementation of some embodiments. Sub-section II.D then describes hardware encoding and decoding utilized by some embodiments. Next, sub-section II.E describes a conceptual data flow and data elements used by some embodiments. Lastly, sub-section II.F describes an exemplary set of protocol commands that may be used by some embodiments.

A. Browser

Some embodiments may be implemented using a browser that is able to be executed by the target system or device. In this configuration, the target browser may be used to render and execute third-party applications on a target I/O element.

Figure 5:
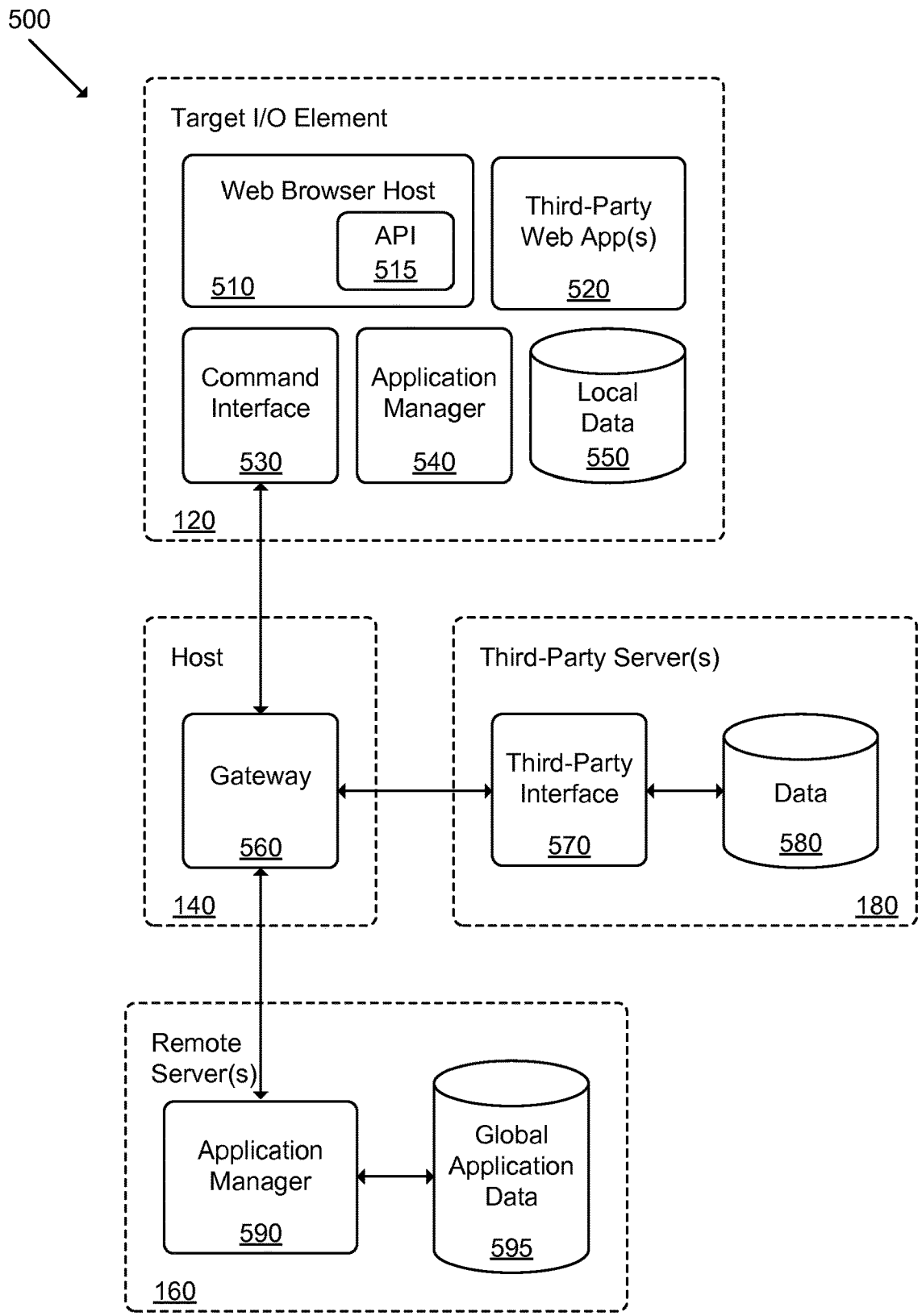
FIG. 5 illustrates a schematic block diagram of a browser-based system used by some embodiments to provide services to a target I/O element capable of executing a web browser.

FIG. 5 illustrates a schematic block diagram of a browser-based system 500 used by some embodiments to provide services to a target I/O element capable of executing a web browser. Specifically, this figure shows various software components that may be used by the various system elements. Such a software system may be implemented using the hardware system 100 described above. As shown, the target I/O element (or system) 120 may execute a web browser host 510 with an associated API 515, a set of third-party web applications 520, a command interface 530, an application manager 540, and local data 550. The host element 140 may execute a gateway 560. Each third-party server 180 may provide an interface 570 and various third-party data 580. The remote server 160 of some embodiments may provide an application manager 590 and global application data 595.

The web browser 510 may be any appropriate browser that is able to be executed by the target device. The API 515 may be, for example, a plug-in based (e.g., JavaScript) API that may allow third-party web applications to communicate with the application manager 540 and with the target system in a uniform way. The API 515 may be modular and may be based on the security policies defined by the application manager 540 for each application. Thus, the API 515 may restrict elements each application is able to access and/or operations the application is able to perform.

Each third-party web application 520 may be an application adapted to operate using the web browser host 510. The command interface 530 may allow the target I/O element 120 to interact with the gateway 560 provided by the host 140, and thus also the third-party servers 180 and/or remote servers 160. The third-party interface 570 may allow the gateway 560 (and thus also the target element 120 and remote server 160) to retrieve application data (and/or other types of data and/or instructions) from the third-party data 580.

In the various architectures described throughout, the gateway 560 and/or interface 530 of some embodiments may be used as the underlying communication link between the target (e.g., a HU) and the host (e.g., a smartphone). Such a communication link allows for a uniform communication interface for different physical links (e.g., Bluetooth, USB, WiFi, future link types, etc.).

The application manager 540 may be a locally-executed target component that manages third-party web applications 520. Such management may include lifecycle, software updates, and/or permissions via manifest files. The application manager 540 may manage local data 550 where the third-party applications 520 are stored. The application manager 540 may communicate with the application manager service 590 to obtain the latest updates and manifest changes. The application manager 540 may, in some embodiments, enforce execution policies based at least partly on target system status (e.g., whether a vehicle is moving, stopped, parked, etc.) for a safer driving experience.

Applications may be updated from the remote server 160 (using an application manager server). The applications 520 may be rendered by the local web browser host 510, which exposes an API library associated with the API 515 that allows the third party applications to communicate with the application manager 540 and/or other target services in a secure and controlled fashion. The target may communicate to the internet via the command interface 530 and/or gateway 560. Third party applications 520 may communicate with associated web servers via the gateway 560 or communicate with mobile device applications via an application router infrastructure of some embodiments.

The application manager 590 may provide a web service API to the local application manager 540 to query for application manifests, new applications, and/or application updates. The application manager 590 may allow clients to query for available applications, download applications, and/or update applications. The application manager may manage the global application data 595. The global application data 595 may include all available third-party applications. The applications may be cataloged by type, target element model, etc. Each application may have an associated manifest file which contains security policies.

One of ordinary skill in the art will recognize that system 500 may be implemented in various appropriate ways without departing from the spirit of the invention. For instance, different embodiments may include different specific components. As another example, some embodiments may include more or fewer elements. In addition, system 500 may be implemented using various specific types of hardware components, as appropriate.

B. Screen Projection

Some embodiments may be implemented with a target device that implements a simple remote viewer and user input handler. Such a configuration does not require the target device to provide a browser.

Figure 6:
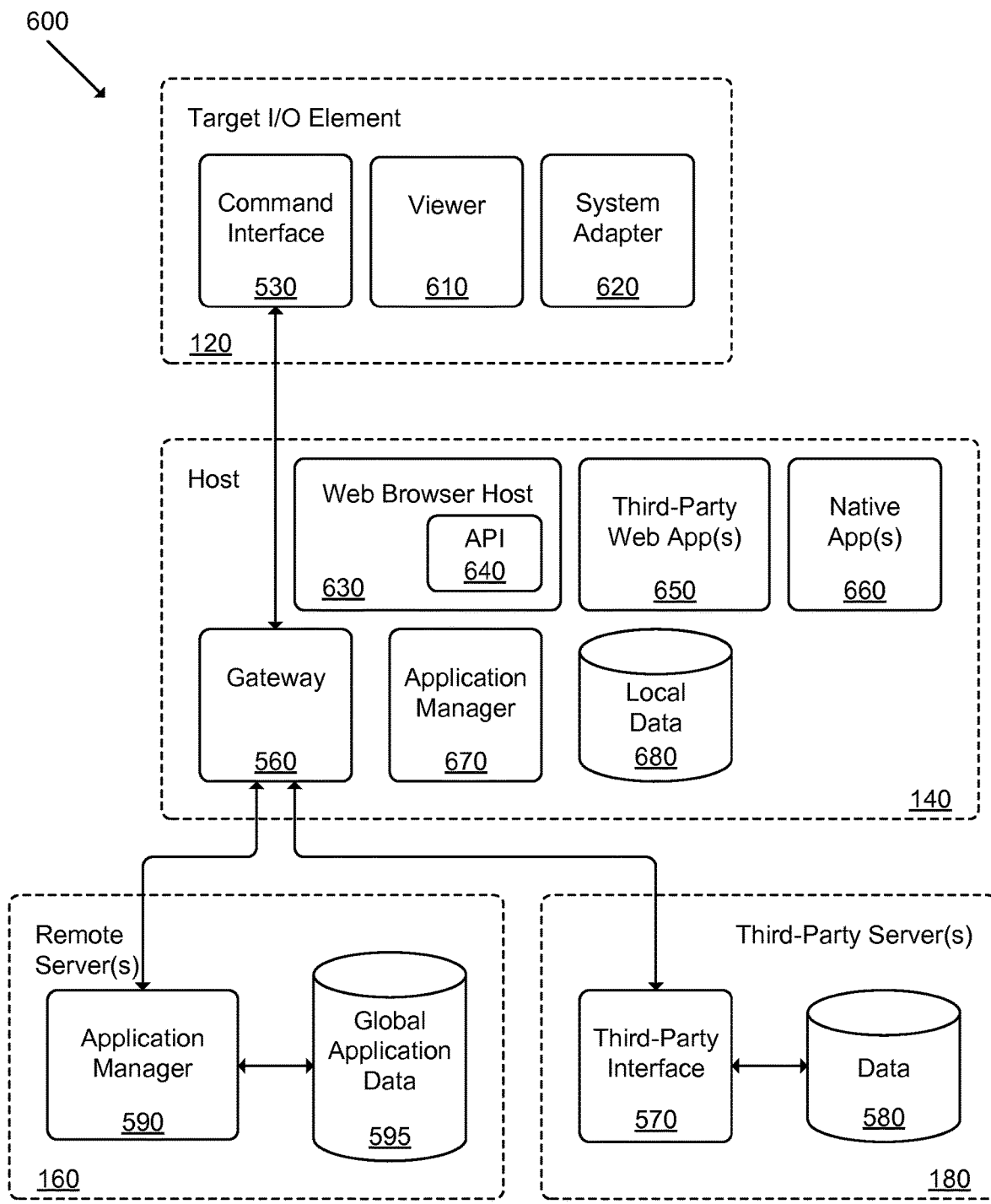
FIG. 6 illustrates a schematic block diagram of a screen projection system used by some embodiments to provide services to a target I/O element capable of providing multimedia content.

FIG. 6 illustrates a schematic block diagram of a screen projection system 600 used by some embodiments to provide services to a target I/O element capable of providing multimedia content. Specifically, this figure shows various software components that may be used by the various system elements. Such a software system may be implemented using the hardware system 100 described above. As shown, in addition to (or in place of) any components described above in reference to system 500, system 600 may include a viewer 610 and system adapter 620 provided by a target component 120, and a web browser host 630 (with associated API 640), third-party 650 and native applications 660, an application manager 670, and local data 680 provided by a host element 140.

In this configuration, the target side may include a command interface 530 (e.g., an API) and a simple remote screen viewer 610 that is able to display the web applications rendered on the host side. The target element 120 may send user inputs to the host 140 and/or may receive screen bitmaps over the gateway layers 560 of some embodiments. In addition, the target 120 may include one or more system adapters 620 that may be adapted to retrieve information from an external system (e.g., vehicle information such as location, speed, vehicle status, etc.) and provide the retrieved information to the API 640 (which may be executed using a web browser host 630) such that the data may be accessed by various third party web applications 650 and/or native applications 660.

On the host 140 side, the application manager 670 and the local data 680 may be used to manage the third party applications 650 and/or native applications 660. Such applications may be rendered off-screen by a web browser running on the host in an appropriate resolution for the target. Any inputs from the target 120 may be received by the gateway 560. The gateway may also send the rendered screens to the target.

The gateway 560 (or "mobile server") may be a host component that "wraps" the native web view component to render its content off-screen and send it to the command interface 530 using an efficient remote screen projection protocol. The command interface may also process the input from the target and pass the input to the web view. The mobile server 560 may generate an off-screen canvas that corresponds to the screen resolution of the target.

One of ordinary skill in the art will recognize that system 600 may be implemented in various appropriate ways without departing from the spirit of the invention. For instance, different embodiments may include different specific components. As another example, some embodiments may include more or fewer elements. In addition, system 600 may be implemented using various specific types of hardware components, as appropriate.

C. Vector Screen Projection

Similar to the screen projection configuration described above, some embodiments may be implemented with a target device that is able to receive, instead of bitmaps of rendered screens, vector information associated with, for instance, scaled and calculated HTML pages.

Figure 7:
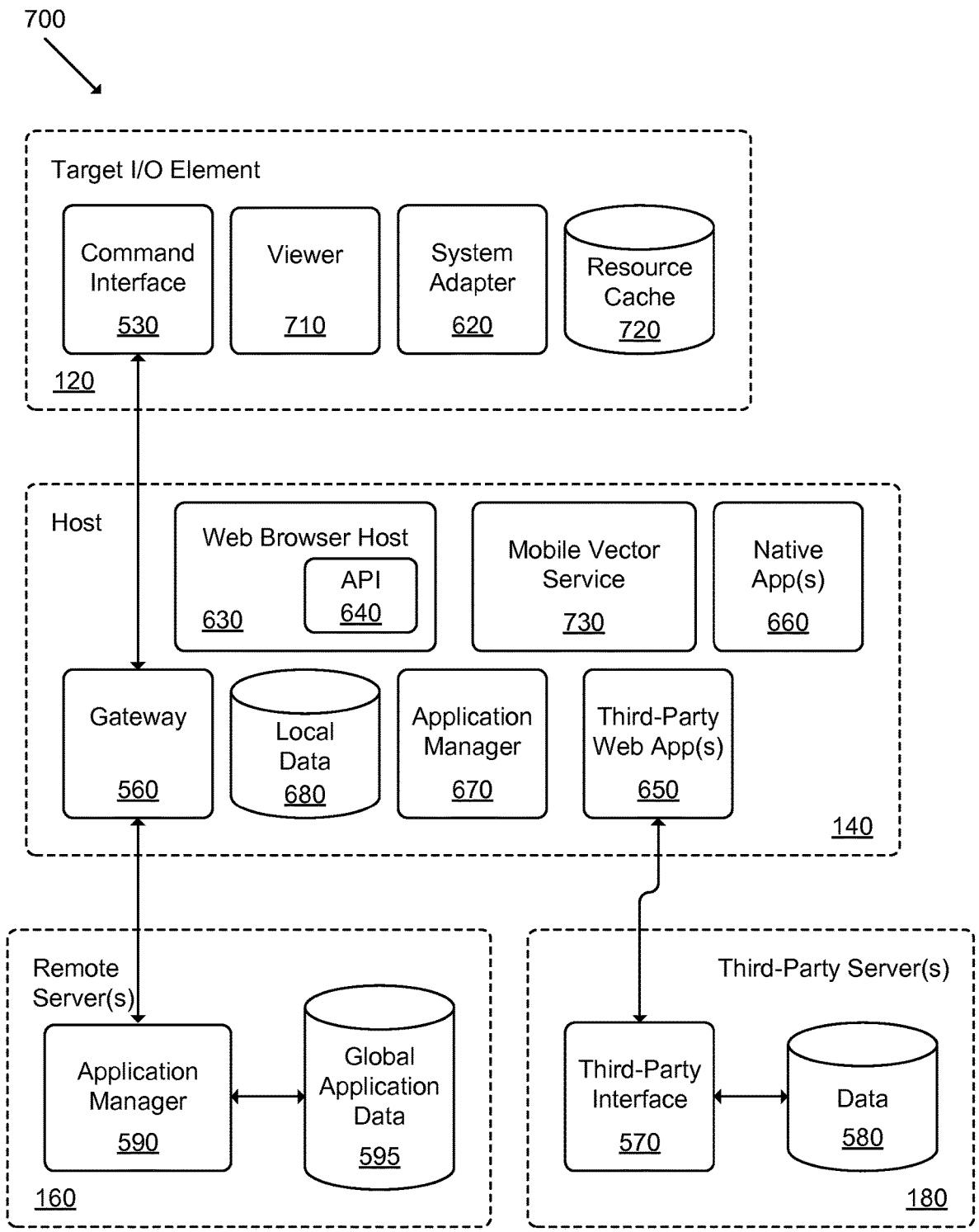
FIG. 7 illustrates a schematic block diagram of a vector screen projection system used by some embodiments to provide services to a target I/O element capable of providing multimedia content.

FIG. 7 illustrates a schematic block diagram of a vector screen projection system 700 used by some embodiments to provide services to a target I/O element capable of providing multimedia content. Specifically, this figure shows various software components that may be used by the various system elements. Such a software system may be implemented using the hardware system 100 described above. As shown, in addition to (or in place of) any components described above in reference to systems 500 and 600, system 700 may include a specialized viewer 710, a resource cache 720, and a mobile vector service 730.

In this configuration, the host 140 includes the browser 630 and API 640, but instead of rendering all the way to a bitmap, the host 140 may execute, for instance, JavaScript and transform the vector graphics. Such vector data may be captured by the mobile vector service 730 which, in turn, sends the data to the target 120 using the gateway 560 and command interface 530. Similarly, native applications 660 may be rendered by the host 140 and individual graphical user interface elements may be captured by the mobile vector service 730 and sent to the target 120.

The target side may include a special viewer 710, which displays the vector graphics received by the host browser 630. The viewer 710 may store common resources such as graphics, bitmaps, fonts, etc. in the resource cache 720. In this way, less data may be sent over the link between the host 140 and the target 120 and the screens may be rendered faster. The resource cache 720 may be a local storage that is able to store common resources to be reused between screen renderings.

The mobile vector service 730 may be a host component that hosts a web browser engine. The mobile vector service may intercept the rendering operations normally performed by the engine and instead of directing such operations to bitmap (or screen), the service may construct a vector description of the screen and send the description to the target. Such an approach may use an adapter that is able capture the vector data from the browser 630. Any resources, such as images, are sent with their IDs (and/or other appropriate information) and the target 120 may determine whether to request the resources if any are not available in the resource cache 720.

One of ordinary skill in the art will recognize that system 700 may be implemented in various appropriate ways without departing from the spirit of the invention. For instance, different embodiments may include different specific components. As another example, some embodiments may include more or fewer elements. In addition, system 700 may be implemented using various specific types of hardware components, as appropriate.

D. Hardware Encoding and Decoding

Some host devices or systems and/or target devices and/or systems may include various hardware components, such as encoders and/or decoders, that may be utilized by some embodiments to perform efficient multimedia processing (e.g., rendering) without burdening a general purpose processor (and/or other appropriate component). Hardware encoding and/or decoding may support, for instance, video, audio, generic data compression and/or communication command processing.

Figure 8:
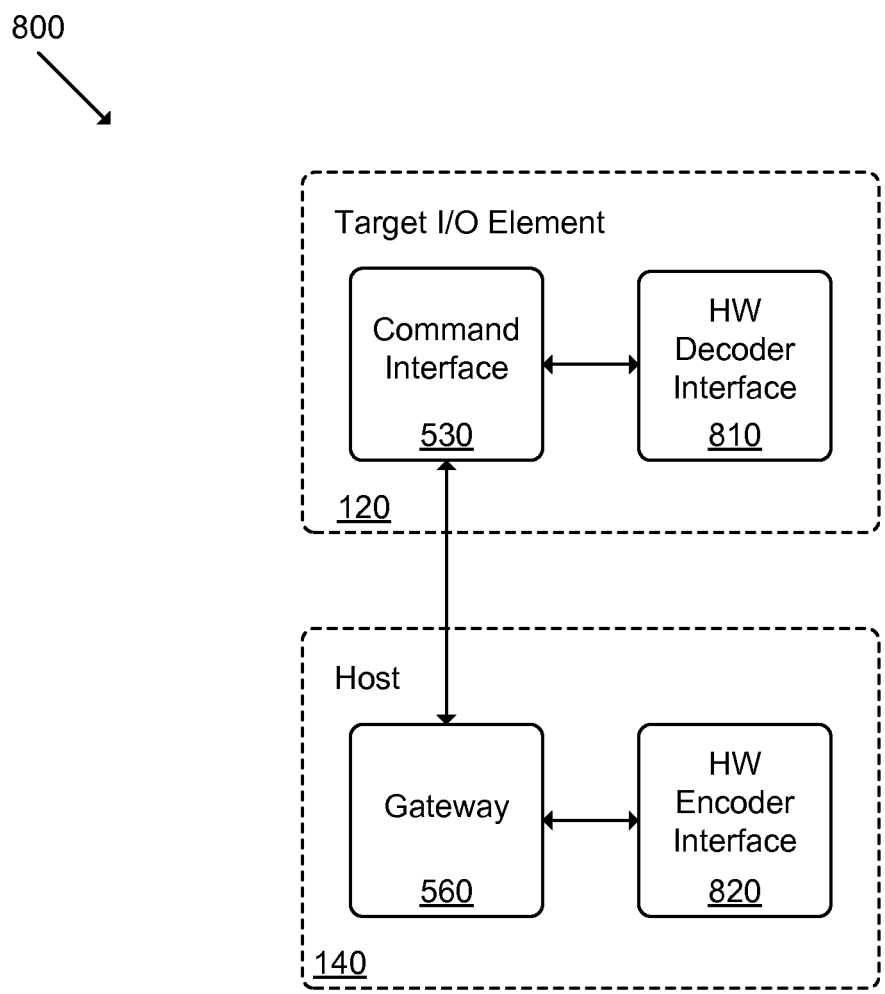
FIG. 8 illustrates a schematic block diagram of a system of some embodiments that utilizes hardware encoding and/or decoding to provide optimized services to a target I/O element capable of providing multimedia content.

FIG. 8 illustrates a schematic block diagram of a system 800 of some embodiments that utilizes hardware encoding and/or decoding to provide optimized services to a target I/O element capable of providing multimedia content. Specifically, this figure shows various software components that may be used by the various system elements. Such a software system may be implemented using the hardware system 100 described above, including sub-elements described in systems 300-400. As shown, in addition to (or in place of) any components described above in reference to systems 500, 600, and 700 system 800 may include a hardware decoder interface 810 and a hardware encoder interface 820. The approach of system 800 may be used, for instance, in conjunction with (and/or in place of) the various solutions described above in reference to FIGS. 5-7.

The hardware decoder interface 810 may be adapted to interact with, for example, a hardware decoder such as decoder 420 described above in reference to FIG. 4. The hardware encoder interface 820 may be adapted to interact with, for example, a hardware encoder such as encoder 320 described above in reference to FIG. 3.

In this configuration, various rendering (and/or vector processing or other appropriate operations) may be performed using a specialized hardware encoder via the interface 820. Such an approach may allow a host device to efficiently process the required operation while leaving a processor associated with the host device free (or more free) to perform other system operations. Likewise, a hardware decoder may be used, via the interface 810, to perform various processing operations using dedicated decoder hardware such that any processors associated with the target element 120 are free (or more free) to perform other system operations. In addition, such hardware decoders and/or encoders may provide enhanced performance (e.g., enhanced speed, power consumption, output quality, etc.) compared to the performance achieved with non-specialized hardware (e.g., processors).

One of ordinary skill in the art will recognize that system 800 may be implemented in various appropriate ways without departing from the spirit of the invention. For instance, different embodiments may include different specific components. As another example, some embodiments may include more or fewer elements. In addition, system 800 may be implemented using various specific types of hardware components, as appropriate.

E. Data Flow

Figure 9:
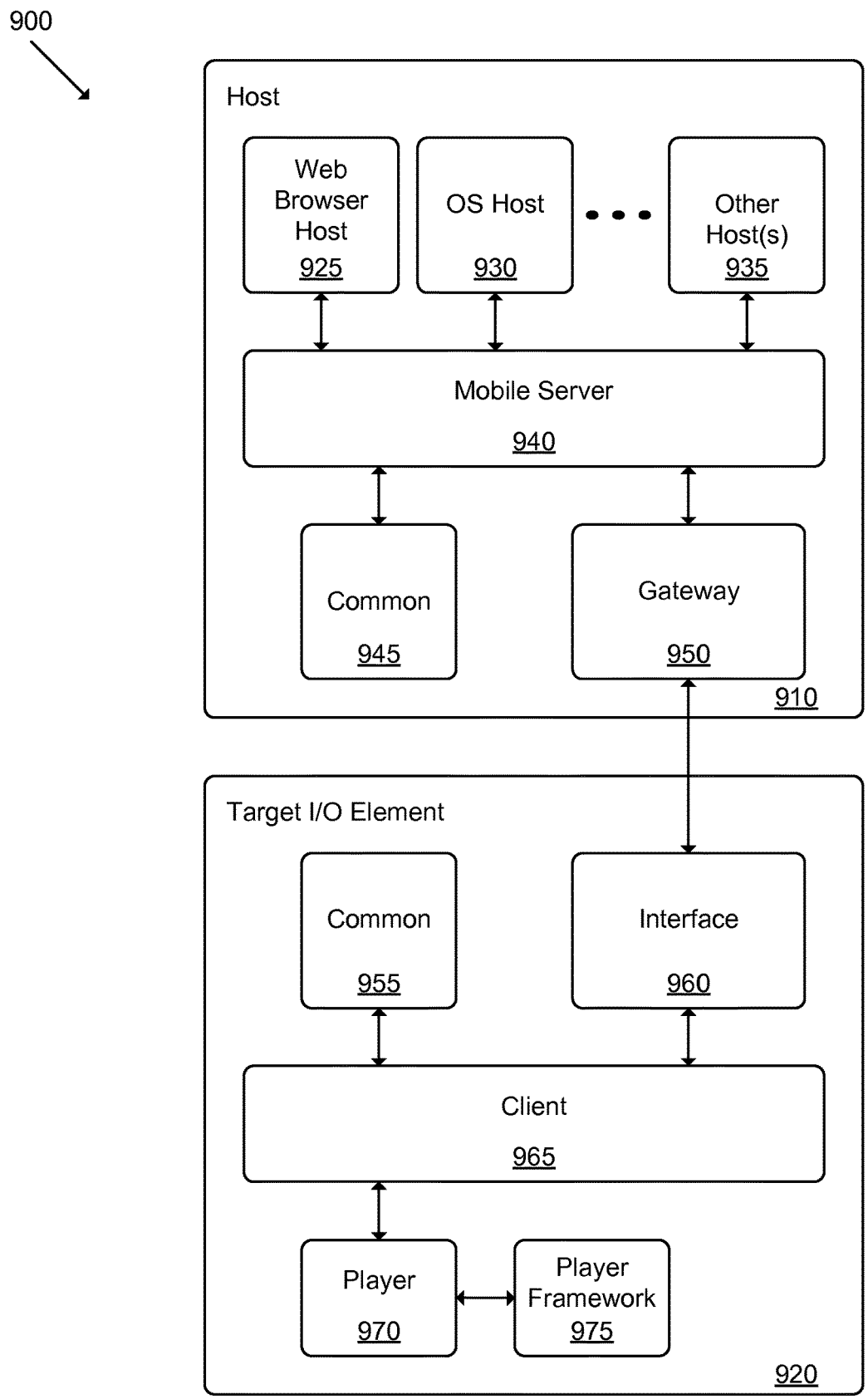
FIG. 9 illustrates a data flow diagram of a system including various data elements and pathways that may be used by some embodiments.

FIG. 9 illustrates a data flow diagram of a system 900 including various data elements and pathways that may be used by some embodiments. Specifically, this figure shows various dependencies and/or references among various data elements. As shown, the system may include a host 910 and a target 920. The host 910 may be any appropriate system or device, as described above in reference to, for instance, FIGS. 1 and 3. The target may be any appropriate system or device, as described above in reference to, for instance, FIGS. 1 and 4. As shown, the host 910 may include a web browser host 925, an OS host 930, one or more other hosts 935, a mobile server 940, common resources 945, and a gateway 950. The target 920 may include common resources 955, a communication interface 960, a client module 965, a player 970, and a player framework 975.

The web browser host 925 may implement browser hosting and screen (i.e., content) capturing. The web browser host may use an underlying mobile server 940 package to send content to a target and/or receive user inputs or commands and simulate the received elements in the browser.

The OS host 930 may be a placeholder for an application host that is able to capture an OS screen. If such a component is needed, it may be OS-specific. The OS host is shown here as an indication of the extensibility of the framework provided by some embodiments.

In addition to the OS host, some embodiments may include other hosts 935. Such hosts may be native applications or mobile services that send screen, audio and other content to the target using the underlying mobile server 940 package.

The mobile server 940 may be a package that includes the main code for serving remote applications to a target. The mobile server may be independent of the actual application providing content. There may be different applications hosts such as a web browser host 925 or an OS host 930 (that intercepts the entire OS), or could be any other application that includes a host component of some embodiments. The mobile server 940 may be able to respond to commands from the target, keep track of target sessions, and/or maintains a state associated with the target. The mobile server may use the underlying gateway package 950 to communicate with the target.

The common resources 945 or 955 may include a package that has common classes and code among the target, host, and/or other resources. The common resources may include definitions for messages and events.

The gateway 950 may allow communication among various hosts 910 and various targets 920. Each target may likewise include a command interface 960 that is able to interact with the gateway 950 in order to exchange data, instructions, user inputs, and/or other elements among the host(s) and target(s).

The client module 965 may be a package that represents a target of some embodiments. The client module may be responsible for handling events from the mobile server 940 and/or sending rendering commands to a player register 970. The client module 965 may also receive input events from the player 970 and construct messages to the mobile server 940. The client module 965 may use the underlying interface 960 to communicate with the host 910 via the gateway 950.

The player 970 may be an implementation of a Player that is based on an appropriate application and/or UI framework 975 (e.g., the "Qt" framework). There could be other players that utilize different graphical frameworks, as appropriate. The player 970 may register with the client module 965 to receive drawing events and send any input events to the player 970.

Although the data flow diagram of FIG. 9 is presented with various specific details, one of ordinary skill in the art will recognize that such a system may be implemented in various different ways without departing from the spirit of the invention. For instance, different embodiments may include different specific data elements. As another example, various data elements may have different specific relationships than shown (e.g., various data elements may depend on various other data elements, may be "aware" of other data elements, may include references to other data elements, etc.).

F. Exemplary Protocol Commands

Some embodiments may include an API that allows communication among various system elements. The API may be accessible to various devices (e.g., devices having a web browser). Communication may be based on custom defined messages. Such messages may be carried over an appropriate communication link (e.g., Bluetooth, serial line, WiFi, LAN, USB, etc.) among the nodes (e.g., host, target, server, etc.). Messages may not be acknowledged in some embodiments. In some embodiments, nodes may generate and send a new message in response to a received message.

Messages may include a protocol version included in the message. In some embodiments, nodes (e.g., the server) may only accept incoming commands which have the expected version. In some embodiments, the message header may include a message header size in order to allow backward protocol compatibility. Each message may include a header and message content. The message header may be implemented by some embodiments as described below in Table 1.

TABLE 1

Parameters:

| Offset [Byte] | Length [Bytes] | Type | Content | Details |
|---|---|---|---|---|
| 0 | 1 | uint8_t | 0x57 | First identification byte |
| 1 | 1 | uint8_t | 0x47 | Second identification byte |
| 2 | 2 | uint16_t | Command ID | Message or command ID |
| 4 | 4 | uint32_t | Payload size | Set to 0 if no additional payload |
| | 8 | | | |

The message content may depend on the message. Various messages the nodes use for communication are described below.

A video configuration command is illustrated below in Table 2. The command may be initiated by the target node to notify the host regarding supported frame decoders and also the desired frame size and/or format. The host may select and initialize the frame encoder based on the formats supported by the target. Then the host may response with another video configuration command in order to notify the target about the selected frame encoding.

TABLE 2

Message ID: 0x20

Parameters:

| Offset [Byte] | Length [Bytes] | Type | Content | Details |
|---|---|---|---|---|
| 0 | 4 | Uint32_t | Source width | Suggested view width to be used by the host. The host may ignore this. |
| 4 | 4 | Uint32_t | Source height | Suggested view height to be used by the host. The host may ignore this. |
| 8 | 4 | Uint32_t | Client width | Width of the frame the host shall send to the target. The host should not ignore this. |
| 12 | 4 | Uint32_t | Client height | Height of the frame the host shall send to the target. The host should not ignore this. |
| 16 | 4 | Uint32_t | Frame encoding | The target sends a bit mask with the supported frame formats. The host shall respond with a single format. The encoding is as follows: 0x01-I420 + LZ4 0x02-H264 |
| | 20 | | | |

A fill rectangle command is illustrated below in Table 3. The command may be sent by the host and may include a frame encoded with the selected encoder.

TABLE 3

Message ID: 0x01

Parameters:

| Offset [Byte] | Length [Bytes] | Type | Content | Details |
|---|---|---|---|---|
| 0 | 4 | int32_t | Width | Encoded frame width |
| 4 | 4 | int32_t | Height | Encoded frame height |
| 8 | 4 | int32_t | Encoding | Frame encoder ID |

TABLE 3-continued

Message ID: 0x01

Parameters:

| Offset [Byte] | Length [Bytes] | Type | Content | Details |
|---|---|---|---|---|
| 12 | 4 | int32_t | App ID | Current application ID |
| 16 | <var> | [byte] | Frame bits | Encoded frame data |
| 16 + <var> | | | | |

A setup scroll command is illustrated below in Table 4. The command may be sent from the host when a new page is opened or connection is established. The purpose of this command is to notify the target regarding the web page extent. The target may decide to setup a scrollbar in order to scroll the web page. The host might not be able to scroll the web page and may need assistance from the target. It is safe to assume that if this command is not sent from the host, then the host is able to handle the page scrolling alone.

TABLE 4

Message ID: 0x40

Parameters:

| Offset [Byte] | Length [Bytes] | Type | Content | Details |
|---|---|---|---|---|
| 0 | 4 | Uint32_t | Document width | Page width in pixels. If the page width is larger than view width, the target should add a horizontal scroll bar. |
| 4 | 4 | Uint32_t | Document height | Page height in pixels. If the page width is larger than view width, the target should add a horizontal scroll bar. |
| 8 | | | | |

A scroll update command is illustrated below in Table 5. This command can be sent both from the target and the host. When it is sent by the host then the target should adjust the scrollbar positions. When it is sent by the target then the host should scroll the web page to the specified position.

TABLE 5

Message ID: 0x41

Parameters:

| Offset [Byte] | Length [Bytes] | Type | Content | Details |
|---|---|---|---|---|
| 0 | 4 | Uint32_t | Horizontal offset | Horizontal scroll position |
| 4 | 4 | Uint32_t | Vertical offset | Vertical scroll position |
| 8 | | | | |

A wait indicator command is illustrated below in Table 6. This command may be sent by the host to notify the target that some heavy processing is taking place or has been completed. In response the target may, for instance, show or hide a wait indicator.

TABLE 6

Message ID: 0x15

Parameters:

| Offset [Byte] | Length [Bytes] | Type | Content | Details |
|---|---|---|---|---|
| 0 | 1 | Boolean | State | True to show wait indicator, false to hide it. |
| 1 | | | | |

A show keyboard command is illustrated below in Table 7. This command may be sent by the host to notify the target that a text element has been selected and some text shall be entered. In response the target may display an appropriate keyboard.

TABLE 7

Message ID: 0x13

Parameters:

| Offset [Byte] | Length [Bytes] | Type | Content | Details |
|---|---|---|---|---|
| 0 | 2 | Uint16_t | Keyboard type | The requested keyboard type: 0-Text 1-Number 2-Phone 3-email |
| 2 | | | | |

A hide keyboard command is illustrated below in Table 8. This command may be sent by the host to notify the target that the keyboard is no longer necessary. In response the target may close the keyboard.

TABLE 8

Message ID: 0x14

Parameters:

| Offset [Byte] | Length [Bytes] | Type | Content | Details |
|---|---|---|---|---|
| 0 | 0 | — | — | No content |
| 0 | | | | |

A mouse command is illustrated below in Table 9. This command may be sent by the target in order to notify the host regarding a mouse event (or other similar cursor-control input element) on the target side. The host may "playback" the event on the loaded web page.

TABLE 9

Message ID: 0x10

Parameters:

| Offset [Byte] | Length [Bytes] | Type | Content | Details |
|---|---|---|---|---|
| 0 | 4 | int32_t | X position | Mouse X position. |
| 4 | 4 | int32_t | Y position | Mouse Y position. |
| 8 | 4 | int32_t | Mouse action | Mouse action: 1-mouse moved 2-button down 3-button up 5-button double clicked |

TABLE 9-continued

Message ID: 0x10

Parameters:

| Offset [Byte] | Length [Bytes] | Type | Content | Details |
|---|---|---|---|---|
| 12 | 4 | int32_t | Mouse button(s) | The mouse button that caused the action, or the pressed buttons in case of mouse move:<br>0x00-No button<br>0x01-Left mouse button<br>0x02-Right mouse button<br>0x04-Middle mouse button |
| 16 | | | | |

A keyboard command is illustrated below in Table 10. This command may be sent by the target in order to notify the host regarding a keyboard event on the target side. The host shall playback the event on the loaded web page.

TABLE 10

Message ID: 0x11

Parameters:

| Offset [Byte] | Length [Bytes] | Type | Content | Details |
|---|---|---|---|---|
| 0 | 2 | Int16_t | Key code | The virtual key code |
| 2 | 4 | int32_t | Keyboard action | The keyboard action:<br>1-key up<br>2-key down |
| 6 | | | | |

A browser command is illustrated below in Table 11. This command may be sent by the target in order to request from the host a specific browser action (e.g., go home, go back, go forward, go to specific address, etc.).

TABLE 11

Message ID: 0x12

Parameters:

| Offset [Byte] | Length [Bytes] | Type | Content | Details |
|---|---|---|---|---|
| 0 | 1 | Uint8_t | Browser action | The requested browser action:<br>0-Go Back<br>1-Go Home<br>2-Go Forward |

TABLE 11-continued

Message ID: 0x12

Parameters:

| Offset [Byte] | Length [Bytes] | Type | Content | Details |
|---|---|---|---|---|
| | | | | 3-Go to address. In this case the address should follow. The length of the address is payload size-1 |
| 1 | <var> | [byte] | Keyboard action | The URL as a text. Used only if the action is "Go to address". |
| <var> + 1 | | | | |

A set current application command is illustrated below in Table 12. This command may be sent by the target in order to request switching to a specific web application.

TABLE 12

Message ID: 0x42

Parameters:

| Offset [Byte] | Length [Bytes] | Type | Content | Details |
|---|---|---|---|---|
| 0 | 4 | Uint32_t | ID_length | Length of application ID |
| 4 | <ID_length> | [byte] | App ID | Application ID |
| 4 + <ID_length> | 4 | Uint32_t | Params_length | Length of application parameters |
| 8 + <ID_length> | <Params_length> | [byte] | | Application parameters |
| 8 + <ID_length> + <Params_length> | | | | |

A reconnect command is illustrated below in Table 13. This command may be sent by the host to notify the target that the host will be stopped temporarily. The target may, in response, save the host address and try to reconnect as soon as possible.

TABLE 13

Message ID: 0x30

Parameters:

| Offset [Byte] | Length [Bytes] | Type | Content | Details |
|---|---|---|---|---|
| 0 | 0 | — | — | No content |
| | 0 | | | |

A set frames per second command is illustrated below in Table 14. This command may be used to dynamically adjust the frame rate depending on target load. It may be sent by the target when the rate of received frames is greater than or less than the rate of frames the target is able to process.

TABLE 14

| | | Message ID: 0x47 | | |
|---|---|---|---|---|
| Parameters: | | | | |
| Offset [Byte] | Length [Bytes] | Type | Content | Details |
| 0 | 1 | Byte | Fps | Target frames per second |

A start audio command is illustrated below in Table 15. This command may be sent by the host. The command may notify the target that audio playback is about to start. The command may include information regarding the audio properties (e.g., codec, sample rate, bits per sample, etc.). When this command is received by the target, the target should, in response, prepare for the audio playback.

TABLE 15

| | | Message ID: 0x43 | | |
|---|---|---|---|---|
| Parameters: | | | | |
| Offset [Byte] | Length [Bytes] | Type | Content | Details |
| 0 | 4 | Uint32_t | Audio Codec | The audio codec ID |
| 4 | 4 | Uint32_t | Sample Rate | The audio sample rate, for example 22000. |
| 8 | 4 | Uint32_t | Sample size | The sample size in bits, 8 or 16 |
| 12 | 4 | Uint32_t | Channel count | The number of audio channels |
| 16 | 4 | Uint32_t | Byte order | The audio samples byte order: 0-Big endian 1-Little endian |
| 20 | | | | |

A stop audio command is illustrated below in Table 16. This command may be sent by the host to notify the target that audio playback should be stopped.

TABLE 16

| | | Message ID: 0x44 | | |
|---|---|---|---|---|
| Parameters: | | | | |
| Offset [Byte] | Length [Bytes] | Type | Content | Details |
| 0 | 0 | — | — | No content |

An audio data command is illustrated below in Table 17. This command may be sent by the host. The command may include audio data in a previously defined format (e.g., as defined by the start audio command).

TABLE 17

| | | Message ID: 0x45 | | |
|---|---|---|---|---|
| Parameters: | | | | |
| Offset [Byte] | Length [Bytes] | Type | Content | Details |
| 0 | <var> | [byte] | Audio data | The audio data |

A pause audio command is illustrated below in Table 18. This command may sent by the host to the target when the audio playback should be paused or resumed. The command may be sent by the target to the host when the host should pause or resume sending audio data. The target may maintain an audio buffer. When the audio buffer becomes full, a "pause" command may be sent. When the buffer is almost empty, a "resume" command may be sent.

TABLE 18

| | | Message ID: 0x46 | | |
|---|---|---|---|---|
| Parameters: | | | | |
| Offset [Byte] | Length [Bytes] | Type | Content | Details |
| 0 | 1 | Byte | Pause | Pause flag: 0-resume 1-pause |

One of ordinary skill in the art will recognize that the message elements described above may be implemented in different ways in various different embodiments. For instance, different embodiments may utilize different specific message IDs. As another example, different embodiments may include parameters of various different lengths than those described above. Furthermore, different embodiments may include various additional messages than shown.

III. Application Management

Sub-section III.A provides a conceptual description of a system used by some embodiments to manage supported applications. Sub-section III.B then describes conceptual database schema associated with application management.

A. System

Figure 10:
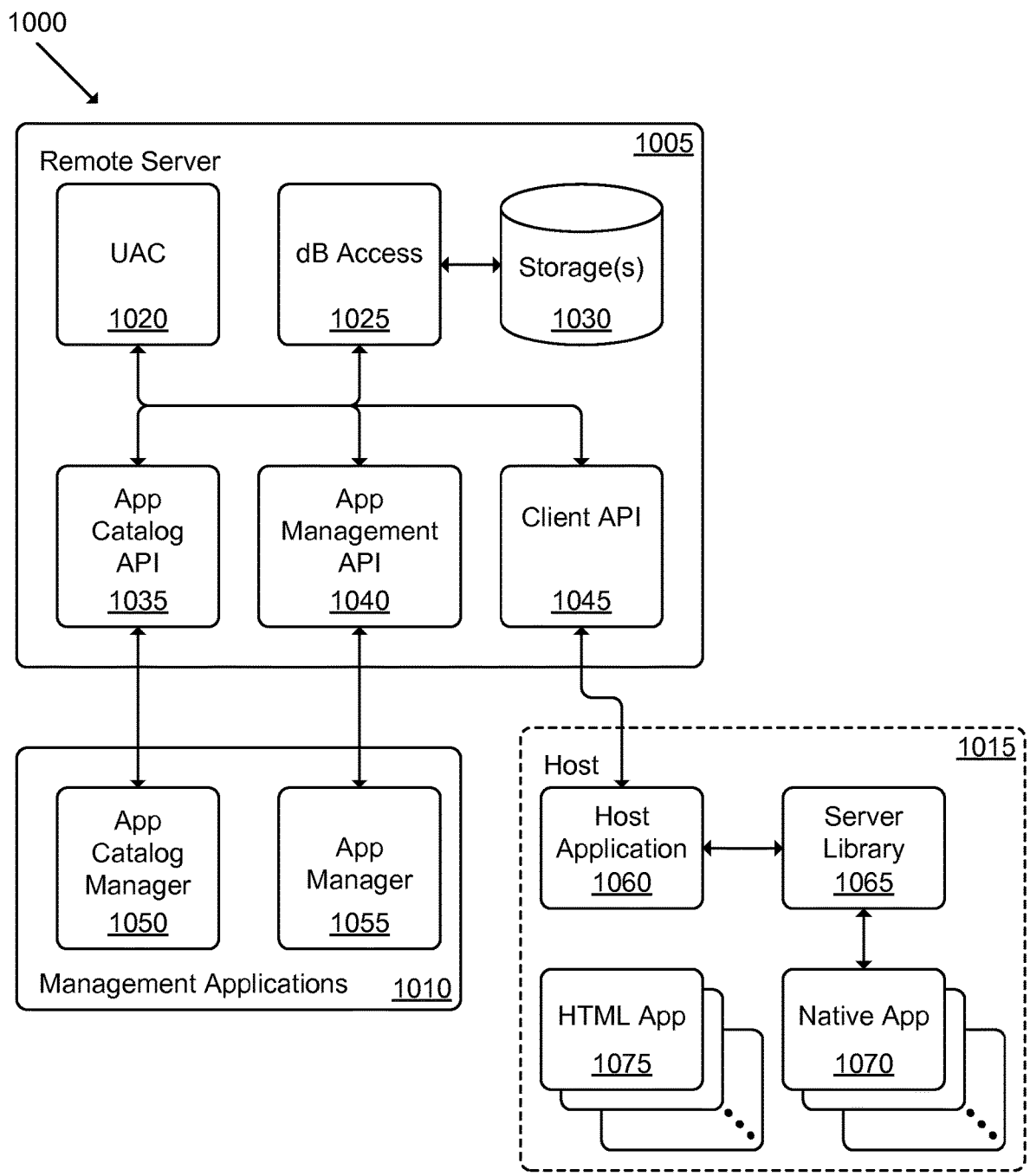
FIG. 10 illustrates a schematic block diagram of a back-end system used by some embodiments to manage host applications in some embodiments.

FIG. 10 illustrates a schematic block diagram of a back-end system 1000 used by some embodiments to manage host applications in some embodiments. As shown, the system may include one or more remote servers 1005 and management applications 1010. The back-end system 1000 may communicate with a host 1015 running on a mobile device (e.g., a smartphone, tablet, etc.). The host 1015 may be similar to, for instance, the host 910 described above in reference to FIG. 9.

Returning to FIG. 10, The remote server(s) 1005 may provide a user access control (UAC) module 1020, a database access element 1025, storages 1030, an application catalog API 1035, an application management API 1040, and a client API 1045.

The UAC module 1020 may determine whether a user has permission to obtain or manipulate a given resource. This module is primarily used by the application management module 1040. For example, if there is a request to delete an application, the UAC may check whether the action is permitted based on the provided user details in the request. The database access interface 1025 may be generic in order to allow use of different database management systems. Any appropriate relational database management system RDBMS may be used. The application management API 1040 may provide a REST API for application management. The API may allow requests for adding deleting and editing applications. The client API 1045 may provide a REST API that allows information needed for the server applications to be obtained. Such information may be accessed using a system access key.

The management applications 1010 may provide an application catalog manager 1050 and an application manager 1055. The application manager may be a web client that allows users to upload, edit or delete applications. The application manager may be implemented as a web application that shows the status of the application and allow management of an application approval process. The management applications 1010 may be executed using a web browser or native application that is allowed to interact with the back-end system 1000 via the remote server 1005.

The host 1015 may provide a host application 1060, a server library 1065 linked to a set of native applications 1070, and a set of HTML applications 1075.

The primary role of back-end system 1000 is to provide a list of available applications and provide infrastructure to download application bundles (e.g., full HTML applications including HTML files, JavaScript files, CSS, resources, etc.) to the host application 1060. In addition, the system may expose REST APIs for different web clients that can be used to manage application and/or application catalogs. System users may have different permissions over the various APIs.

A given "managed" application (i.e., any application that is managed via the back-end system 1000 and is able to run on the host 1015) may have many different forms. The applications could include different types. For example, a given application could be a hosted HTML application on one platform and a native application on another platform. The application could have different styles depending on the connected target system type, selected preferences, and/or other appropriate factors. The application could have different modes of operation depending on the connected target system and/or I/O element included therein. For example, a high-end vehicle may allow more functions to be enabled compared to a lower-end model. Similarly, there could be different application versions depending on the host platform. Each individual incarnation of an application may be defined via an application descriptor. There could be many different application descriptors for the same application. Depending on the connected device, the remote server 1005 may send the application descriptor that is the most relevant.

Some embodiments may be able to work with different applications on the host side. Some may be hosted by the remote server 1005, others may be hosted by third party sites or be native apps on the host. Regardless of the type, there may be a descriptor for each application stored in the application catalog, which may be passed to the host application 1060 on the host 1015. Supported application types may include, for example, hosted HTML applications, local HTML applications (or application bundles), and native applications.

A hosted HTML application may be an HTML application that is hosted on the remote server 1005 or one or more third party web servers. The application may be provided as an URL to the host application 1060 which renders it in the host browser. The application may be partially or fully cached on the host 1015 using a standard HTTP caching mechanism.

A local HTML application may be an HTML application that has all HTML, JavaScript, CSS, and resource files in an application bundle. The bundle may be downloaded from the remote server 1005 by the host application 1060 and may be stored on the host 1015. The application may be loaded in a mobile browser. The application may have a version and the host application 1060 may download a new application bundle if an updated bundle is available.

Native host applications (e.g., smartphone applications) may be linked with the special server library 1065. These applications may be registered at the remote server 1005 using application identifiers. This approach allows users to select from a main home screen (rendered by the host application 1060) to switch to native applications using platform specific methods. Such platform specific methods may include, for example, using application protocol URLs.

Each application may have many different styles depending on the target system type, selected user preferences, and/or other appropriate factors. Typically, a style may require "skin" changes without major functionality changes, which may be controlled via an application mode parameter. The styles may be changed dynamically and could be preloaded (pre-cached) on the host. Styles may be primarily CSS and resource changes. Examples of styles are "day/night" style, different personal styles or different vehicle model styles.

The applications could have different functionality based on the selected mode (e.g., style, vehicle type, etc.). The mode may define, for instance, a target type, manufacturer, and/or model that may be used to enable and/or disable certain functionality based on known capabilities of the target. Modes may typically be set upon application startup and not changed dynamically.

A given application may have different implementations depending on the host platform. For example, an application may be implemented as a native application on one mobile platform and a hosted HTML application for other platforms. This may be reflected via an application platform parameter included in the application descriptor.

Some applications, such as hosted HTML applications, may be generic and require some small adaptations to support operation within the system of some embodiments. This is achieved via one or more adapter modules (e.g. JavaScript code), which may be injected by the host application into the web view when an application is loaded. Each adapter module may be associated with a given application descriptor. In some embodiments, an adapter may be associated with each platform. Alternatively, an adapter may detect the platform via an agent string and execute the appropriate code.

In order to support fast application loading and off-line access, some embodiments support local HTML applications. Such applications may be HTML applications, script-based applications, etc. All the application files (e.g., HTML, JS, CSS, resources, etc.) may be combined into a compressed file and stored on the remote server 1005. Each application bundle may have an associated version, which allows the host application to detect whether the local bundle needs updating.

One of ordinary skill in the art will recognize that system 1000 may be implemented in various different ways in different embodiments. For instance, some embodiments may include additional modules or fewer modules. As another example, various modules may be combined to form a single module and/or various single modules may each be divided into a set of sub-modules.

B. Database Schema

The main concept in this database schema is a managed application. Such an application represented via an application table illustrated below in Table 19. This table describes a managed application. Such an application may have a name, description, category, owner, and/or other elements.

TABLE 19

| Field | Type | Description |
| --- | --- | --- |
| AppID | INT | (Primary Key) A unique identifier for the application |
| Name | String | Name of the application. This may be an internal name that uniquely identifies the application. For example "XYZ Internet Radio" or "ABC Search App". The application name as it will be seen by an end user is defined in the deployment application table. |
| Description | String | A description of the application to help application deployment managers to understand what the application does and what the main features are. This information is not shown to the end user and is used primarily for application deployment managers to decide whether to include a given application in a deployment or not. |
| Category | String | Defines one or more categories in which the application belongs. This may be used for easier searching and classification of applications. |
| IsHomeApp | Boolean | Flag that defines whether the application is a home application or not. In a given deployment there may be only one home application which allows launching the other applications. |
| OwnerUserID | INT | ID of the user who created the application. This is a foreign key to a user table. |

A given application could have different "incarnations" for different platforms, target system models or styles, etc. In some cases the application could be an HTML5 application, in others the application may be native. These variations are described via the application descriptor table illustrated below in Table 20. This table describes application descriptors associated with the application. An application descriptor may refer to a specific application bundle, URL or AppID.

TABLE 20

| Field | Type | Description |
| --- | --- | --- |
| AppDescriptorID | INT | (Primary Key) Unique identifier for the application |
| AppID | INT | Foreign key to the application. |
| DisplayName | String | Name of the app descriptor. This is used to help the application managers select the correct descriptor. The name should be informative and include the technology and platform. For example "XYZ Internet Radio HTML5 Universal" or "ABC Search App Platform DEF Native". |
| BundleResourceID | INT | (Optional) Foreign key to the resource descriptor table identifying an HTML application bundle. This may be used with a local HTML application for the other types of application this field may be NULL. |
| AdapterMatchRule | String | (Optional) Rule that identifies how to apply a web application adapter to the current application. |
| AdapterResourceID | INT | (Optional) Foreign key to the resource descriptor identifying the application adapter to be applied to the application. The value may be NULL when there is no adapter. |
| URL | String | URL to a hosted HTML application or application identifier for a native application. A separate field may be used for native applications. |
| LastModified | DateTime | Defines when the application was last updated/modified. |
| Version | String | The application version. |
| AppStyle | String | Defines the styles that the given application supports. These may be suggestive strings to be used by the application deployment manager to select the correct app descriptor and style. |
| AppMode | String | Defines the modes that the given application supports. These are suggestive strings to be used by the application deployment manager to select the correct app descriptor and mode. |
| AppPlatform | String | Defines the platform that the given app descriptor supports. |

The application may be deployed differently to the various client systems. A given deployment may be defined via the deployment descriptor table illustrated below in Table 21. This table may include various deployment descriptors. A deployment descriptor may define a specific deployment configuration that has an associated key. When a host application of some embodiments is executed (e.g., using a smartphone), the key may be passed to the remote server to obtain a list of available applications. The back-end system may use the key to find the deployment descriptor and then retrieve the catalog of associated deployment applications.

TABLE 21

| Field | Type | Description |
| --- | --- | --- |
| DeploymentDescriptorID | INT | (Primary Key) Unique identifier for the descriptor. |
| Name | String | Name of the deployment configuration. This is a name given by the application manager to identify and distinguish better between the various deployment configurations. |
| Description | String | Describes the deployment configuration for easier management. |
| WeblinkKey | String | Alphanumeric key associated with the deployment configuration. |
| OwnerUserID | INT | ID of the user who created and owns the deployment configuration. This ID may point to the user table. |

The deployment application table may define the association between a specific application descriptor and a given deployment. This table associates application descriptors with a particular deployment descriptor. The table defines, for a given deployment configuration, mode, style and platform, the application that should be shown in the home screen, using a specific icon and name. The deployments application table is illustrated below in Table 22.

TABLE 22

| Field | Type | Description |
| --- | --- | --- |
| DeploymentAppID | INT | (Primary key) Unique identifier for the item. |
| DeploymentDescriptorID | INT | Foreign key to deployment descriptor. Defines the associated deployment configuration. |
| AppDescriptorID | INT | Foreign key to application descriptor. Defines the specific application to be used for the deployment. |
| DeploymentName | String | Name of the application as it will be displayed to the user. May include support for multiples languages. |
| DeploymentIndex | INT | Order in which the application will appear in the home screen. |
| IconResourceID | INT | Foreign key to resource descriptor. Points to the image of the application icon to be displayed in the home screen. |
| DeploymentStyleID | INT | Foreign key to deployment style. Defines which style the application should use. |
| DeploymentModeID | INT | Foreign key to deployment mode. Defines which mode the application should use. |
| PlatformID | INT | Foreign key to platform. Defines which platform the application should use. |

Any resources such as images, application bundles, etc. that are stored and managed by the system are represented via the resource descriptor table illustrated below in Table 23. These kinds of resources are referenced by the other tables by ID. Also, a resource is associated with a user who uploaded it and thus may only be available for viewing and editing by authorized users (e.g., users from the same company, a system administrator, etc.). This table describes a resource such as a file that is managed by the back-end system. The resource could be an application bundle, an adapter, an application icon, etc. Each resource may be associated with the user who uploaded it.

TABLE 23

| Field | Type | Description |
| --- | --- | --- |
| ResourceID | INT | (Primary key) Unique identifier for the resource. |
| UserID | INT | (Foreign key) The user who created and/or uploaded the resource. Points to the user table. |
| AppID | INT | Identifies the application with which this resource is associated with. |
| ResourceType | String | The type of resource, e.g. app bundle, app icon, etc. |
| URL | String | URL of the resource if to be accessed from outside. |
| FileName | String | Name and path of the file as stored on the server. |
| Size | INT | Size of the file in bytes. |
| LastModified | DateTime | Defines when the resource was last updated/modified. |

A platform table, illustrated below in Table 24, defines the available platforms for which the system is supported.

TABLE 24

| Field | Type | Description |
| --- | --- | --- |
| PlatformID | INT | (Primary key) Unique identifier for the item. |
| FullName | String | Name of the platform, e.g. ABC 4.x |

TABLE 24-continued

| Field | Type | Description |
|---|---|---|
| Type | String | The type of platform, e.g. "ABC", "XYZ", etc. |
| Version | String | Version of the platform, e.g. "4.0.x" |

A deployment style table, illustrated below in Table 25, defines the available application styles for a given deployment configuration.

TABLE 25

| Field | Type | Description |
|---|---|---|
| DeploymentStyleID | INT | (Primary key). Unique identifier for the item. |
| DeploymentDescriptorID | INT | Foreign key to deployment descriptor. Defines the associated deployment configuration. |
| IsDefault | Boolean | Defines whether the style is default or not. There could be only one default style per given deployment descriptor. |
| Name | String | Name of the style. |

A deployment mode table, illustrated below in Table 26, defines the available application modes for a given deployment configuration.

TABLE 26

| Field | Type | Description |
|---|---|---|
| DeploymentStyleID | INT | (Primary key). Unique identifier for the item. |
| DeploymentDescriptorID | INT | Foreign key to deployment descriptor. Defines the associated deployment configuration. |
| IsDefault | Boolean | Defines whether the mode is default or not. There could be only one default mode per given deployment descriptor. |
| Name | String | Name of the mode. |

The back-end system of some embodiments may be able to be used by many different users that have different privileges. Users are managed by the user table, illustrated below in Table 27, and user group table. Resources, applications and deployments are associated with users. This allows the back-end system to manage who has the privilege to see, edit and manage applications or deployments. The user table may include information regarding the users. Users may be associated with one company (and/or other similar types of entities) and one or more user groups. Users from the same company with the same privileges may be able to access resources created by different users from the same company.

TABLE 27

| Field | Type | Description |
|---|---|---|
| UserID | INT | (Primary key) Unique identifier for the item. |
| UserKey | String | Authentication key for the given user. |
| UserGroupID | INT | Foreign key to user group. Identifies the group that the user belongs to. May be implemented as an additional table such that one user may belong to multiple groups and one group may have multiple users. |
| CompanyID | INT | Foreign key to company table. Identifies a company associated with the user. |
| AdditionalPermissions | String | Defines permission for the current user in addition to the permissions from the associated user group(s). |
| Exclusions | String | Defines access limitations for the current user. |

The user group table, illustrated below in Table 28, may define a group of users with common permission privileges.

TABLE 28

| Field | Type | Description |
|---|---|---|
| GroupID | INT | (Primary key) Unique identifier for the item. |
| GroupName | String | Name of the group |
| GroupPermissions | String | Defines the permission rules for the group. |

The company table, illustrated below in Table 29, may define a company. One user may be associated with only one company. This may allow users from the same company with the same privileges to be able to access resources created by other users from the same company.

TABLE 29

| Field | Type | Description |
|---|---|---|
| CompanyID | INT | (Primary key). Unique identifier for the item. |
| CompanyName | String | Name of the company |
| CompanyDescription | String | Description of the company. |

One of ordinary skill in the art will recognize that the database schema described above are for example purposes only and different embodiments may be implemented using various different schema. For instance, different embodiments may use different structures than tables. As another example, various different sub-elements may be named differently, included in various different tables, be implemented using different data types, etc.

IV. Methods of Operation

Sub-section IV.A provides a conceptual description of various communication protocols used by some embodiments. Sub-section IV.B then describes various encoding methods used to optimize performance in some embodiments. Next, sub-section IV.C describes various adaptive adjustments performed by some embodiments. Lastly, sub-section IV.D describes using and target system inputs received through the target. The various methods described below may be implemented using various combinations of hardware elements such as those described above in Section I, various combinations of software elements such as those described above in Section II, and/or other appropriate elements (and/or combinations of elements).

A. Protocols

Various approaches may be used by some embodiments for remote screen capturing, transmitting and playing at a target. Some embodiments provide an extensible protocol that allows for efficient exchange of the data between the host and the target (and/or between the host and a remote server).

Some embodiments may use a "stateless" implementation where the host is not aware of the state of the target and waits for requests from the target to send screen elements. One example of such an implementation is a traditional VNC protocol. The advantage of such an approach is that the host may be simpler, consume less memory, and be able to interact more easily with multiple targets. However, response latency may be an issue as the target must request an update for the host to send data. Furthermore, bandwidth may be consumed as the host "does not know" what data is available to the target and thus must send a full image.

Some embodiments may use a "stateful" implementation where the host is aware of the state of the target and thus may send only changes. Such an approach reduces the bandwidth requirements as only changes are sent and also reduces the latency as changes are sent immediately after being detected at the host. This approach requires the host to keep a copy of at least the most recent information send to the target.

A stateful implementation may be the preferred communication mode for some embodiments, because the stateful mode is intended primarily for peer-to-peer communication between two devices (e.g., a smartphone and in-vehicle HU). However, the command-based protocol of some embodiments also allows mixing stateful and stateless implementations.

A "combinational" implementation may keep state(s) for certain target device(s) and operate statelessly with other targets. Such a configuration may be useful, for example, when implementing a configuration where a smartphone acts as a server for an in-vehicle head-unit and also for a set of back-seat entertainment displays.

In order to be extensible and efficient, some embodiments use a command-based communication protocol. Commands may be sent from the host to the target with updated screen information (e.g., a new screen, new video frame, new vector elements, etc.), or commands can be sent from the target with user input information (e.g., touchscreen inputs, keyboard or keypad events, etc.), device information (e.g., screen resolution, capabilities information, etc.), or external system information (e.g., GPS, CAN bus information, etc.). The commands may include header information, properties, and payload with the actual data.

Figure 11:
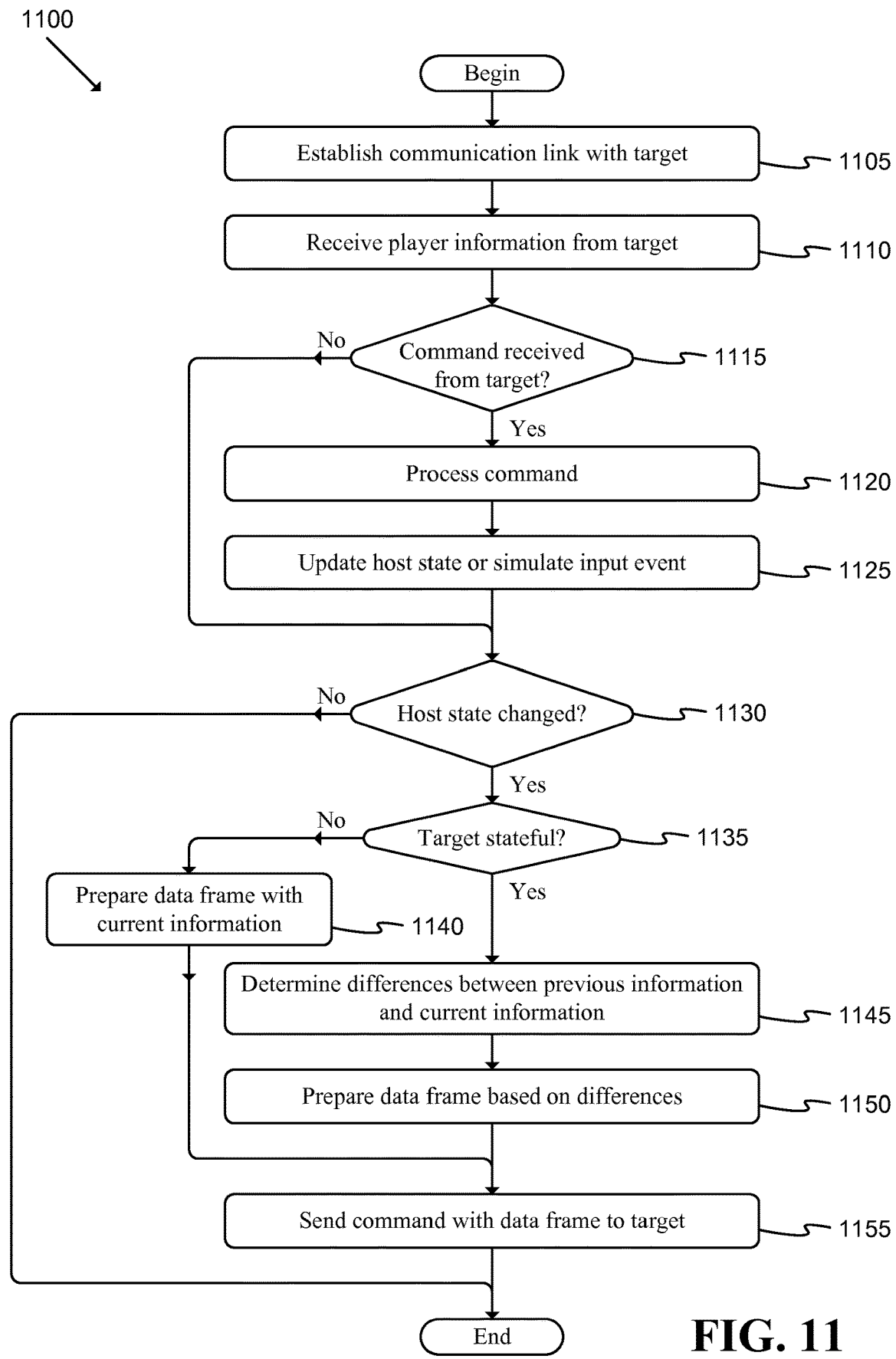
FIG. 11 illustrates a flow chart of a host-side (or "server-side") process used by some embodiments to allow interaction among at least one host and at least one target.

FIG. 11 illustrates a flow chart of a host-side (or "server-side") process 1100 used by some embodiments to allow interaction among at least one host and at least one target. Such a process may begin, for instance, when a host application of some embodiments is launched by a host device.

Next, process 1100 may establish (at 1105) a communication link with a target. Such a link may be established in various appropriate ways (e.g., by automatically transferring a set of messages among the host and target, based on various user preferences, settings, and/or selections, and/or in other appropriate ways). The operations used to establish the link may depend at least partly on the type of link (e.g., a wired connection between host and target, a Bluetooth connection, etc.).

The process may then receive (at 1110) player information from the target. Such information may include, for example, screen resolution, screen encoding schema, frame rate, capabilities, etc.

Next, the process may determine (at 1115) whether a command has been received from the target. Such a command may include, for instance, a touch screen command, hardware button press, change in frame rate, etc. In some embodiments, the target device may be a passive device (i.e., the host may simply send data to the target whether or not any response is received). In such cases, operation 1120 may be omitted (and/or any information received may be ignored).

If the process determines (at 1115) that no command has been received, the process may continue to operation 1130. Alternatively, if the process determines (at 1115) that a command has been received, process 1100 may then process (at 1120) the received command and update (at 1125) the host state or simulate an input event. In some embodiments, operations 1115-1125 may be iteratively performed as long as the communication link is maintained by the host and target.

After determining (at 1115) that no command has been received from the target, or after updating (at 1125) the host state, the process may determine (at 1130) whether the host state has changed. Such a change may include, for instance, a change to the screen that requires an update (on systems where this may be detected), a new audio frame being available to stream, a screen refresh time has elapsed (e.g., when the host is not able to determine whether the screen has been changed and sends screen refresh information at regular intervals based on a frame rate provided by the target), etc.

If the process determines (at 1130) that the host state has not changed, the process may end. Alternatively, if the process determines that the host state has changed, the process may then determine (at 1135) whether a stateful implementation is being used. Such a determination may be made in various appropriate ways (e.g., by querying the target to determine the capabilities of the target, based on an evaluation of the type of communication link(s) available, based on the type of information to be sent to the target, etc.).

If the process determines (at 1135) that a stateless implementation is to be used, the process may then prepare (at 1140) a data frame with the current information and continue to operation 1155. Such information may include, for instance, image data, vector data, etc.

If the process determines (at 1135) that a stateful implementation is being used, the process may then determine (at 1145) the differences between the previous information and the current information (e.g., information based on updated data received from a remote server), and prepare (at 1150) a data frame based on the differences.

When preparing (at 1140 or at 1150) a data frame, the process may encode a video frame (e.g., using H264 video encoding format), encode an audio stream (e.g., using mp3 format, advanced audio coding (AAC) format, etc.), reduce the screen rate (e.g., using I420 encoding), and/or perform generic compression of data (e.g., ZLIB compression, LZ4 compression, etc.). When using some encoding schema, video data may include only the differences from a previous frame, and thus operation 1145 may be omitted in some cases.

After preparing (at 1140 or at 1150) a data frame, the process may send (at 1155) a command including the data frame to the target and then end. In some embodiments, operations 1130-1155 may be iteratively performed as long as the communication link is maintained by the host and target.

In some embodiments, operations 1115-1125 may be implemented in parallel with operations 1130-1155. In such embodiments, the process may monitor the target to determine whether any command has been received and also monitor the host state to determine whether updates are necessary.

One of ordinary skill in the art will recognize that process 1100 is conceptual in nature and may be implemented in various different ways without departing from the spirit of the invention. For instance, the various operations of process 1100 may be performed in a different order. In addition, various other operations may be performed and/or various operations may be omitted, as appropriate. The process may be performed as part of a larger macro process or divided into multiple sub-processes. Such a process may be performed continuously, at regular intervals, based on satisfaction of a set of conditions, and/or otherwise performed as appropriate.

Figure 12:
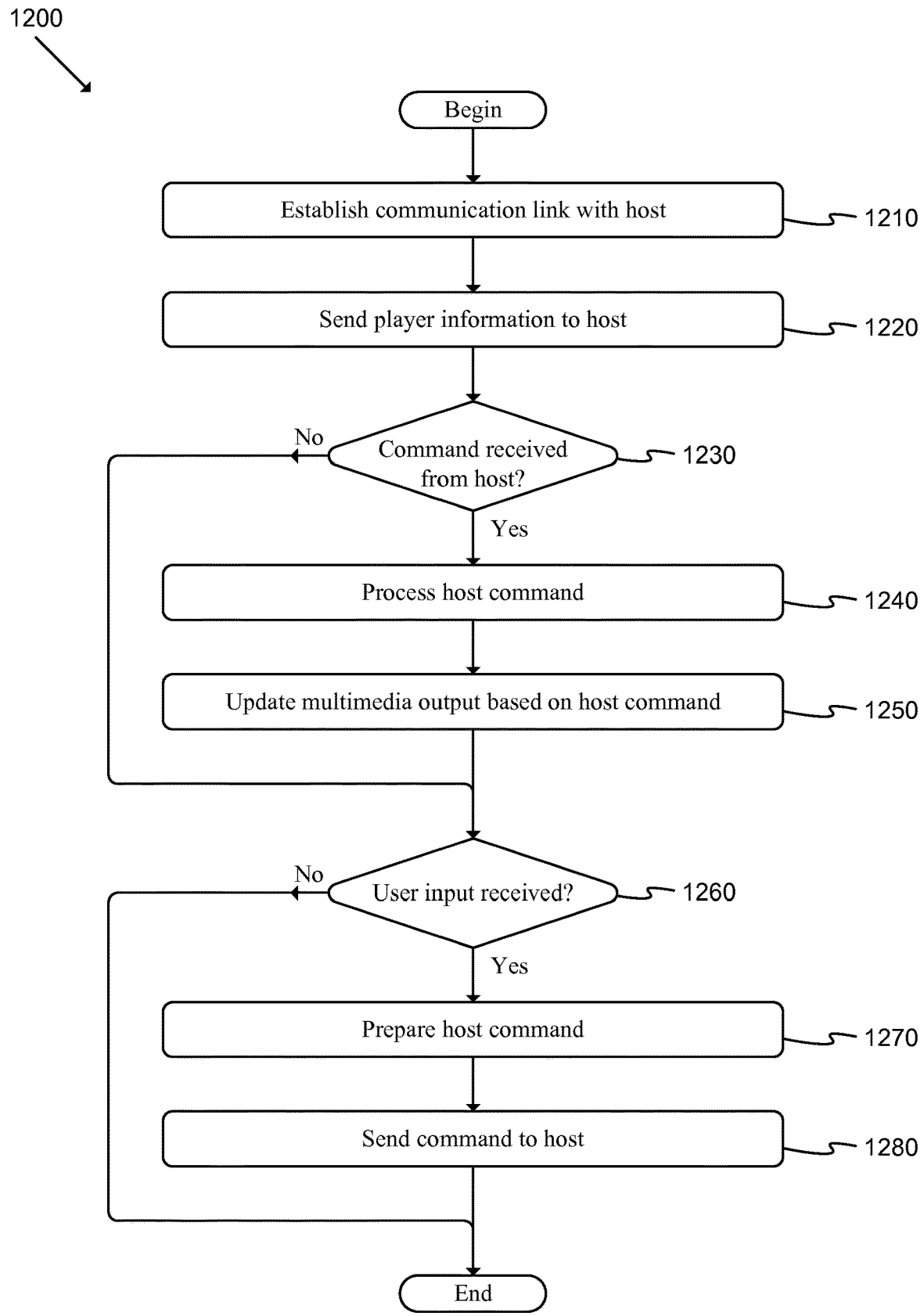
FIG. 12 illustrates a flow chart of a target-side (or "client-side") process used by some embodiments to allow interaction among at least one host and at least one target.

FIG. 12 illustrates a flow chart of a target-side (or "client-side") process 1200 used by some embodiments to allow interaction among at least one host and at least one target. Such a process may begin, for instance, when a browser or player used by some embodiments is launched by a target device. Next, process 1200 may establish (at 1210) a communication link with a host. Such a link may be established in various appropriate ways (e.g., by automatically transferring a set of messages among the host and target, based on various user preferences, settings, and/or selections, and/or in other appropriate ways). The operations used to establish the link may depend at least partly on the type of link (e.g., a wired connection between host and target, a Bluetooth connection, etc.).

Next, process 1200 may send (at 1220) player information to the host. Such information may be associated with a player used by the target device to provide content to a user. The player information may include various attributes associated with the player (e.g., screen resolution, screen encoding schema, frame rate, capabilities, etc.).

Process 1200 may then determine (at 1230) whether a command has been received from the host. Such commands may use various appropriate formats, protocols, interfaces, etc. A command may be received over the communication link.

If the process determines (at 1230) that a command has been received from the host, process 1200 may process (at 1240) the host command in various appropriate ways. For instance, such processing may include frame decoding, drawing of vector elements, processing audio frames, etc.

The host command may include a data frame. Such a data frame may be uncompressed (if compressed), decoded using a software or hardware decoder (which may be applied to a previous frame in a stateful implementation), and/or processed in various other appropriate ways. The host command may also include information related to application-specific commands (e.g., a notification to show a software keyboard when determining that a user has selected an edit field, notification of an app starting and an associated ID that may be used to generate a list of active applications and allow a user to select among them, etc.).

The process may then update (at 1250) the multimedia output (e.g., video, audio, graphics, etc.) based on the host command. In some embodiments, operations 1230-1250 may be iteratively performed as long as the communication link is maintained by the host and target.

After updating (at 1250) the multimedia output or after determining (at 1230) that no command has been received from the host, the process may determine (at 1260) whether a user input has been received. A user input may be received through a target element such as a touchscreen, hardware buttons, voice input, etc. The user input may be received over the communication link. Such a user input may include information related to an application or content being provided on the target device. For instance, a user may press a "next" key to skip to the next song in a playlist, a user may provide input to an application (e.g., an internet radio application) being displayed on the target device, etc.

If the process determines (at 1260) that a user input has been received, the process may prepare (at 1270) a host command and send (at 1280) the command to the host. In some embodiments, the command may be encoded at the target (e.g., audio from a microphone that is encoded into AAC or MP3 frames). Such a command may be formatted in various appropriate ways and include various specific data elements. Such formatting may depend on properties of the target or host, user preferences regarding the operation of the target or host, etc. The command may be sent over the communication link.

After sending (at 1280) the command to the host, or after determining (at 1260) that no use input has been received, the process may end. In some embodiments, operations 1260-1280 may be iteratively performed as long as the communication link is maintained by the host and target.

In some embodiments, operations 1230-1250 may be implemented in parallel with operations 1260-1280. In such embodiments, the process may monitor the host to determine whether any command has been received and also monitor the user inputs of the target to determine whether a user input has been received.

One of ordinary skill in the art will recognize that process 1200 is conceptual in nature and may be implemented in various different ways without departing from the spirit of the invention. For instance, the various operations of process 1200 may be performed in a different order. In addition, various other operations may be performed and/or various operations may be omitted, as appropriate. The process may be performed as part of a larger macro process or divided into multiple sub-processes. Such a process may be performed continuously, at regular intervals, based on satisfaction of a set of conditions, and/or otherwise performed as appropriate.

In a similar manner to the approach described above in reference to FIGS. 11-12, a host and remote server (and/or third-party server) may establish a communication link and/or send and receive data, as appropriate. In such a configuration, the host and remote server(s) may perform various different functions (e.g., data storage and retrieval, request handling, etc.) either separately or conjunctively by each sending and/or receiving data and/or instructions from other system components.

B. Encoding

In order to achieve optimal throughput, some embodiments use various encoding methods for encoding data sent to a target. Such an approach may be primarily used for the screen data sent from the host to the target, but can also be used for data sent to the host (and/or remote or third-party server). Because a command-based protocol is used in some embodiments, the encoding methods may be described in a command header and may be switched dynamically to adapt to various performance parameters (e.g., the available bandwidth, application load, etc.) and/or other appropriate factors (e.g., user selection, properties related to the content, etc.).

Figure 13:
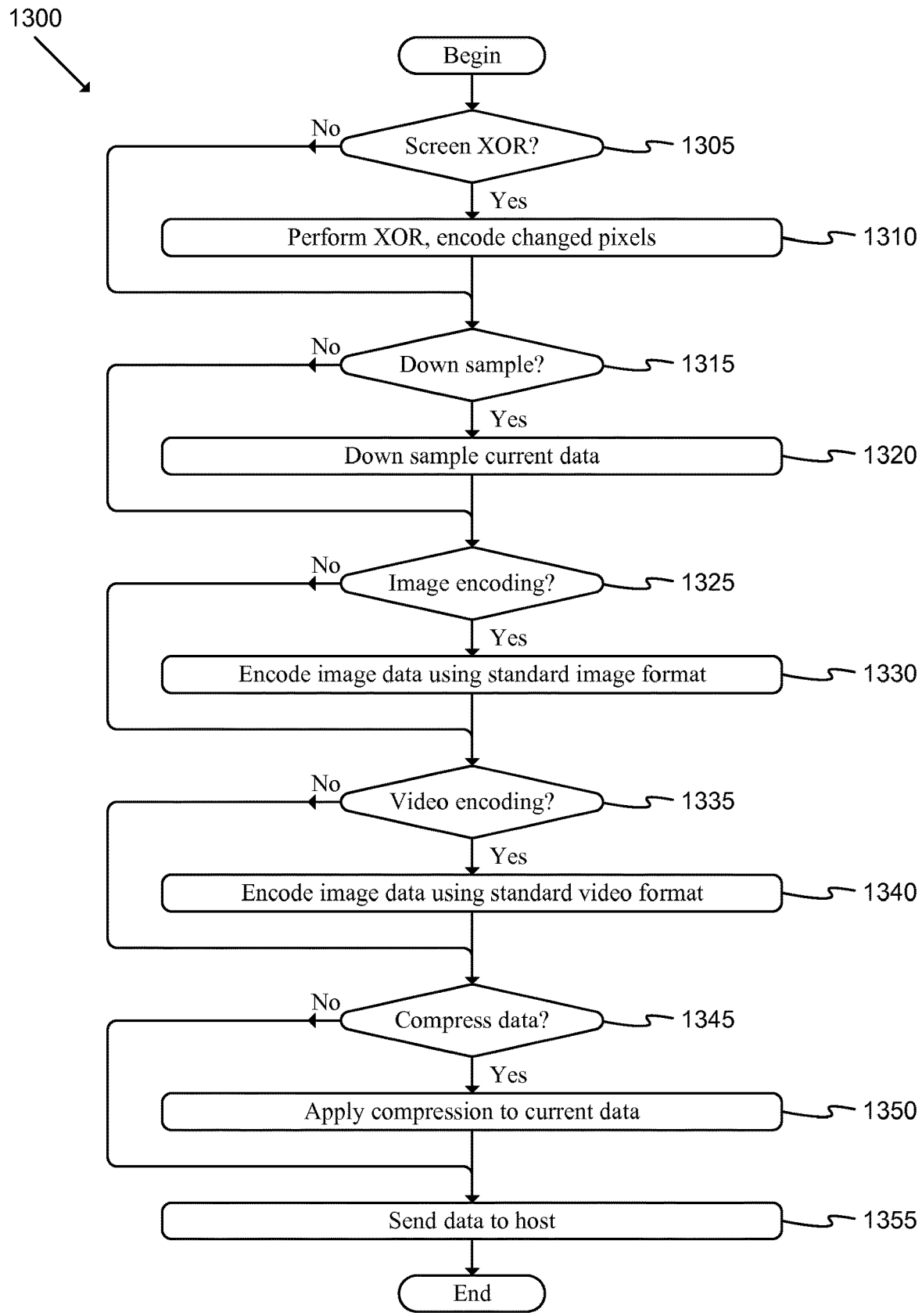
FIG. 13 illustrates a flow chart of a process used by some embodiments to encode data to be sent from a host to a target.

FIG. 13 illustrates a flow chart of a process 1300 used by some embodiments to encode data to be sent from a host to a target. Such a process may begin, for instance, when data becomes available for a host to send to a target.

Next, process 1300 may determine (at 1305) whether to perform a screen XOR operation. Such a determination may be made in various appropriate ways based on various appropriate factors. If the process determines (at 1305) to perform a screen XOR, the process may then perform (at 1310) an XOR operation between a current screen and a most recent screen and encode the changed pixels.

Performing an XOR operation requires a stateful communication mode. The host may compare each new screen with the most recently sent screen and send only the changed pixels. The changes may be encoded using, for example, run length encoding (RLE) where only the changed pixels are sent and the gaps (i.e., pixels that have not changed) are encoded with a simple count value. Such an approach may useful and very efficient for small screen changes.

If the process determines (at 1305) that screen XOR is not to be performed, or after performing (at 1310) the XOR, the process may determine (at 1315) whether to perform a down sample operation. Such a determination may be made in various appropriate ways based on various appropriate factors. If the process determines (at 1315) to perform a down sample operation, the process may then down sample (at 1320) the current data.

Typically, a balance needs to be struck between loss of quality, speed of conversion, and image size. For example, one down sampling format that some embodiments support is "I420", which uses twelve bits per pixel and stores the pixels in the YUV color space (using an eight bit Y plane followed by eight bit two-by-two subsampled U and V planes).

If the process determines (at 1315) that a down sample is not to be performed, or after performing (at 1320) the down sample, the process may determine (at 1325) whether to perform image encoding. Such a determination may be made in various appropriate ways based on various appropriate factors. If the process determines (at 1325) to perform an image encoding operation, the process may then encode (at 1330) the current image data using a standard format.

Such encoding may use standard image formats such as JPG or PNG. JPG can be quite compact, especially with loss of quality. However, the challenge is to encode the image fast enough. If done using the host CPU (and if the CPU lacks sufficient processing power), such an approach may be too slow to achieve twenty-five to thirty frames per second. However, if done using specialized video hardware, the performance could be good enough to achieve such throughput. Some embodiments support frames or images encoded with PNG, JPG and/or other formats.

If the process determines (at 1325) that image encoding is not to be performed, or after performing (at 1330) the image encoding, the process may determine (at 1335) whether to perform video encoding. Such a determination may be made in various appropriate ways based on various appropriate factors. If the process determines (at 1335) to perform a video encoding operation, the process may then encode (at 1340) the current image data using a standard format.

Standard video encoding formats may provide very good compression and may be streamed and played back directly by the target. One example of such a video format is "H.264" (or "MPEG-4"). Such an approach requires the target to have a video decoder. Another format that may be used is "VP8", which provides a better encoding speed. Similar to image encoding, video encoding may be optimized using special video hardware.

The image and video encoding techniques may be used to produce compact and standard image or video streams. Encoding them in real-time may be very taxing on a host device CPI and there might not be enough CPU power to achieve a high enough frames per second rate. A solution to this problem is to use the specialized video encoding hardware that is typically available on modern devices (e.g., smartphones, tablets, etc.). Many such devices may support real-time video recording, which typically uses such fast real-time hardware encoding. Some systems allow access to the video encoding hardware and ability to control the input and output (e.g., via the OS), allowing some embodiments to provide a very efficient and compact remote screen projection solution.

If the process determines (at 1335) that video encoding is not to be performed, or after performing (at 1340) the video encoding, the process may determine (at 1345) whether to compress the data. Such a determination may be made in various appropriate ways based on various appropriate factors. If the process determines (at 1345) to perform a compression operation, the process may then compress (at 1350) the current data.

Some embodiments may apply a generic compression algorithm to the data. One such option is to use the standard "zlib", which provides relatively good compression, but the actual compression process could be very slow and CPU intensive. Another approach is to use the faster "LZ4" compression. Some embodiments support both algorithms, and other compression types may be added and utilized as well.

If the process determines (at 1345) that compression is not to be performed, or after performing (at 1350) the compression, the process may send (at 1355) the data to the target and then end.

One of ordinary skill in the art will recognize that process 1300 is conceptual in nature and may be implemented in various different ways without departing from the spirit of the invention. For instance, the various operations of process 1300 may be performed in a different order. In addition, various other operations may be performed and/or various operations may be omitted, as appropriate. The process may be performed as part of a larger macro process or divided into multiple sub-processes. Such a process may be performed continuously, at regular intervals, based on satisfaction of a set of conditions, and/or otherwise performed as appropriate.

C. Adaptive Adjustment

One of the key features of some embodiments is the use of an adaptive approach as to what data is used, how to encode it and what image quality to use. Because a command-based protocol is used, the command can change the format, compression, encoding, frame rate, quality and/or other attributes on the fly.

Figure 14:
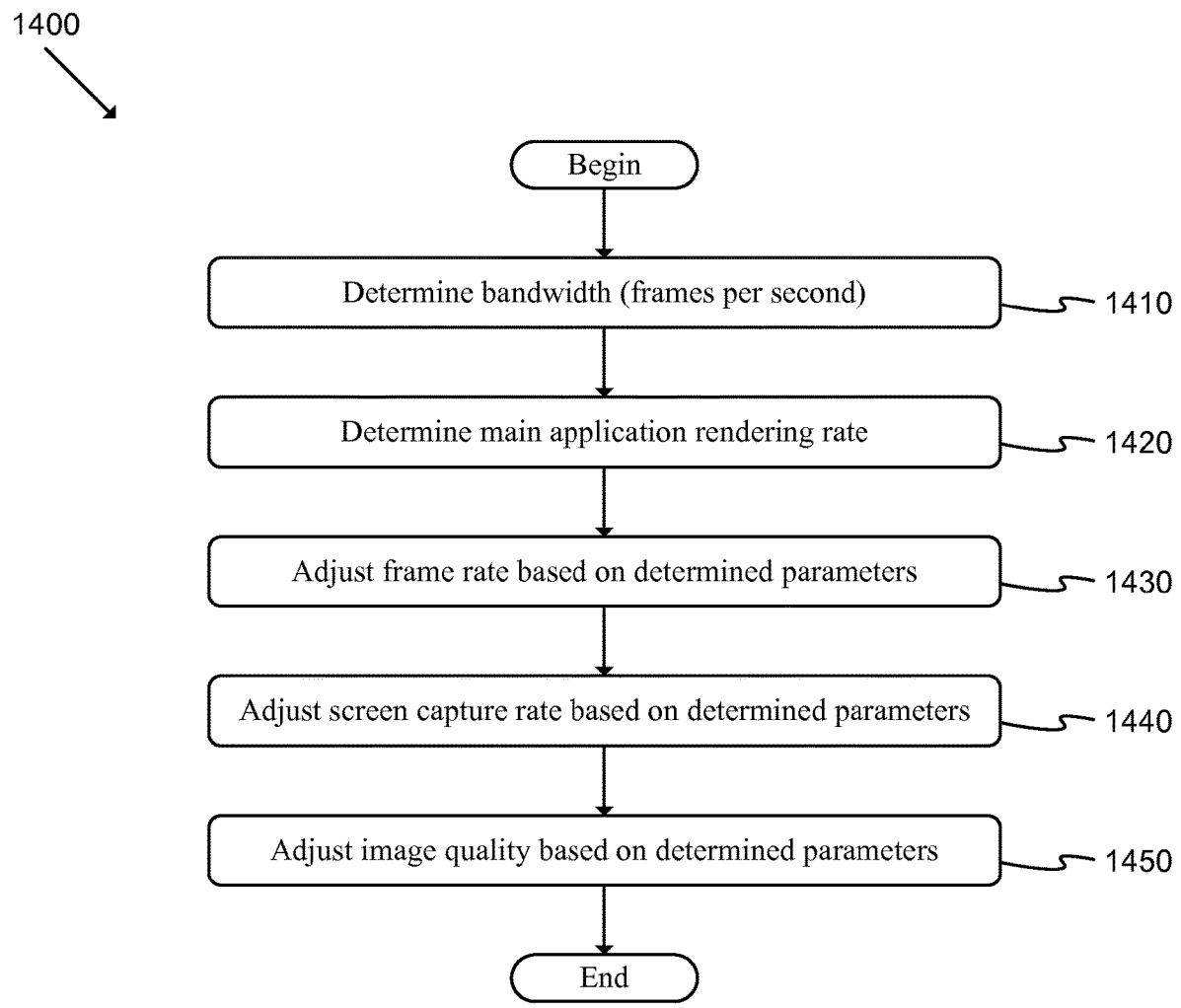
FIG. 14 illustrates a flow chart of a conceptual process used by some embodiments to adaptively adjust various attributes to achieve optimized throughput and quality based on current operating conditions.

FIG. 14 illustrates a flow chart of a conceptual process 1400 used by some embodiments to adaptively adjust various attributes to achieve optimized throughput and quality based on current operating conditions. Such a process may begin, for instance, when data is available to be sent from a host to a target in some embodiments. As shown, the process may determine (at 1410) available bandwidth (e.g., in frames per second). Such a determination may be made in various appropriate ways (e.g., by examining data previously sent between the host and target, by retrieving system information that specifies maximum bandwidth, etc.).

Next, the process may determine (at 1420) a main application rendering rate. Such a determination may be made in various appropriate ways (e.g., by retrieving performance information associated with the application, by retrieving performance data for one or more hardware elements used to execute the main application, etc.).

The process may then adjust (at 1430) the frame rate based at least partly on the determined parameters (e.g., bandwidth, rendering rate, and/or other appropriate performance parameters). In this way, some embodiments may continuously adjust the frame rate (alternatively, image quality may be adjust such that smaller or larger data packets are generated, as appropriate) based on the determined parameters. In addition, the target player may determine the frame rate that the player is able to support and report the rate to the host via a special command. The host may then set the frame rate of the host as the minimum between the preferred frame rate of the target and the possible supported frame rate on the host. In this way, the host will not be processing and sending more frames than the target can handle.

Next, the process may adjust (at 1440) the screen capture rate based at least partly on the determined parameters. For instance, screen capturing frequency may be reduced if the main application rendering is slowed down. For example, when a web application is being loaded, the system of some embodiments may not need to capture screens, but can notify the target to wait. This allows the CPU on the host to be free to perform actual application processing.

The process may then adjust (at 1450) image quality based at least partly on the determined parameters and then end. As mentioned above, the quality of the images being sent may be reduced when the bandwidth is lower. As another example, lower-quality images may be interspersed among higher-quality images (e.g., when animation or video is generated, the host may send high-quality images once a second and the rest of the images may be sent with lower quality to reduce the utilized bandwidth).

One of ordinary skill in the art will recognize that process 1400 is conceptual in nature and may be implemented in various different ways without departing from the spirit of the invention. For instance, the various operations of process 1400 may be performed in a different order. In addition, various other operations may be performed and/or various operations may be omitted, as appropriate. The process may be performed as part of a larger macro process or divided into multiple sub-processes. Such a process may be performed continuously, at regular intervals, based on satisfaction of a set of conditions, and/or otherwise performed as appropriate.

D. User and Target System Inputs

In some embodiments, the target may be responsible for capturing user input events on the client-side (e.g., a vehicle HU serving as a target) and sending data related to the captured events to a remote server (via the host) to be processed by a currently running application. Due to the extensible nature of some embodiments, various types of existing or subsequently developed user input hardware elements (and associated events) may be included.

A touchscreen is an example of a hardware element that may be used to capture user input events in some embodiments. Any captured touch events (e.g., single touch events, multi-touch events, etc.) may be translated to the host. Hardware buttons (or collections of buttons such as keypads, and/or other appropriate elements) may be translated to hardware key events on the application side (at a host, remote server, and/or third-party server, etc.).

Multiple modes of keyboard input may be supported by some embodiments. For instance, a keyboard may be rendered natively on the target side. The keyboard may be shown when the focus is on an input element. This allows for a very responsive UI and a minimum amount of data being sent back and forth, as the keyboard is rendered on the target directly. Alternatively, the keyboard may be rendered by the application itself (e.g., via HTML) and be handled in a similar manner to any other UI element.

Some target systems (e.g., vehicles) may have special input features such as steering wheel buttons, rotary knobs, etc. Such inputs may be supported through a set of extensible user input commands. The inputs may be captured by the hardware, and translated by a system adapter (e.g., system adapter 620 described above) into commands and sent to the host (and/or to a remote or third-party server). On the host and/or server the commands may be interpreted as generic UI commands (e.g., scroll, back, etc.) or be handled through a system-specific API.

In addition to user inputs, some target systems (e.g., vehicles) have other input sources (e.g., sensors related to GPS, speed, etc., CAN or other bus information, etc.) that could be utilized by some applications. The command structure of some embodiments allow for such data to be passed among the target, host, and server. Such data may be passed as broadcast message, using a subscription-notification feature, using request/response messages, and/or other appropriate ways. Such input sources may be handled by a system adapter component.

Figure 15:
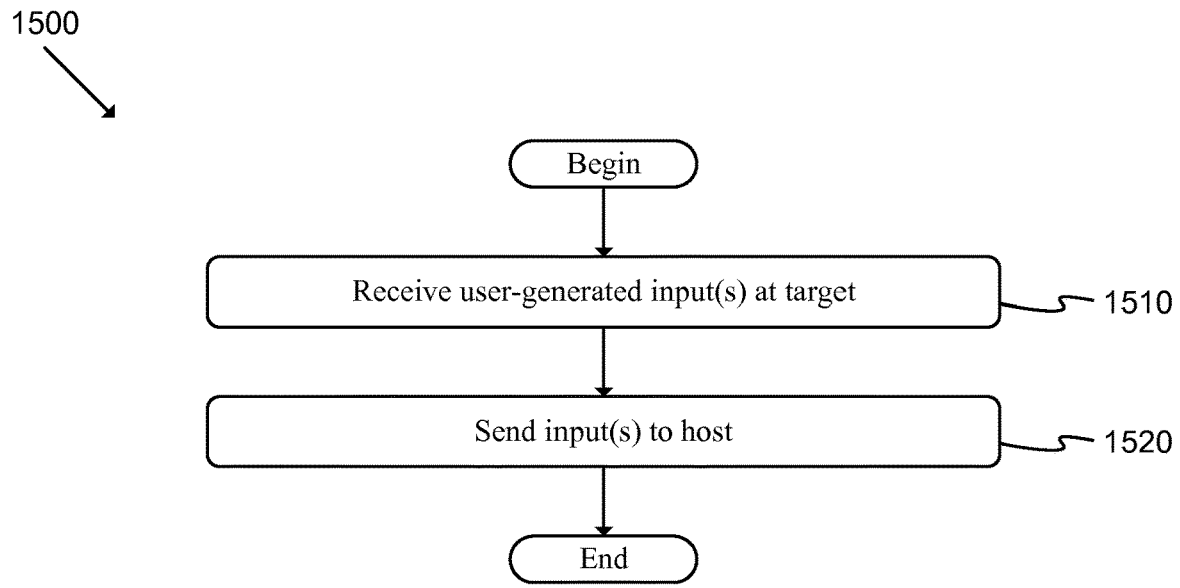
FIG. 15 illustrates a flow chart of a target-side conceptual process used by some embodiments to capture and react to user input events.

FIG. 15 illustrates a flow chart of a target-side conceptual process 1500 used by some embodiments to capture and react to user input events. Such a process may begin, for instance, when an application is launched by a target in some embodiments. As shown, the process may receive (at 1510) user-generated inputs at the target. The process may then send (at 1520) the received inputs to the host. Such inputs may be received, formatted, packaged, and/or sent in various appropriate ways depending at least partly on the configurations of the target element, the host element, the communication pathway between the elements, and/or other appropriate factors.

One of ordinary skill in the art will recognize that process 1500 is conceptual in nature and may be implemented in various different ways without departing from the spirit of the invention. For instance, the various operations of process 1500 may be performed in a different order. In addition, various other operations may be performed and/or various operations may be omitted, as appropriate. The process may be performed as part of a larger macro process or divided into multiple sub-processes. Such a process may be performed continuously, at regular intervals, based on satisfaction of a set of conditions, and/or otherwise performed as appropriate.

Figure 16:
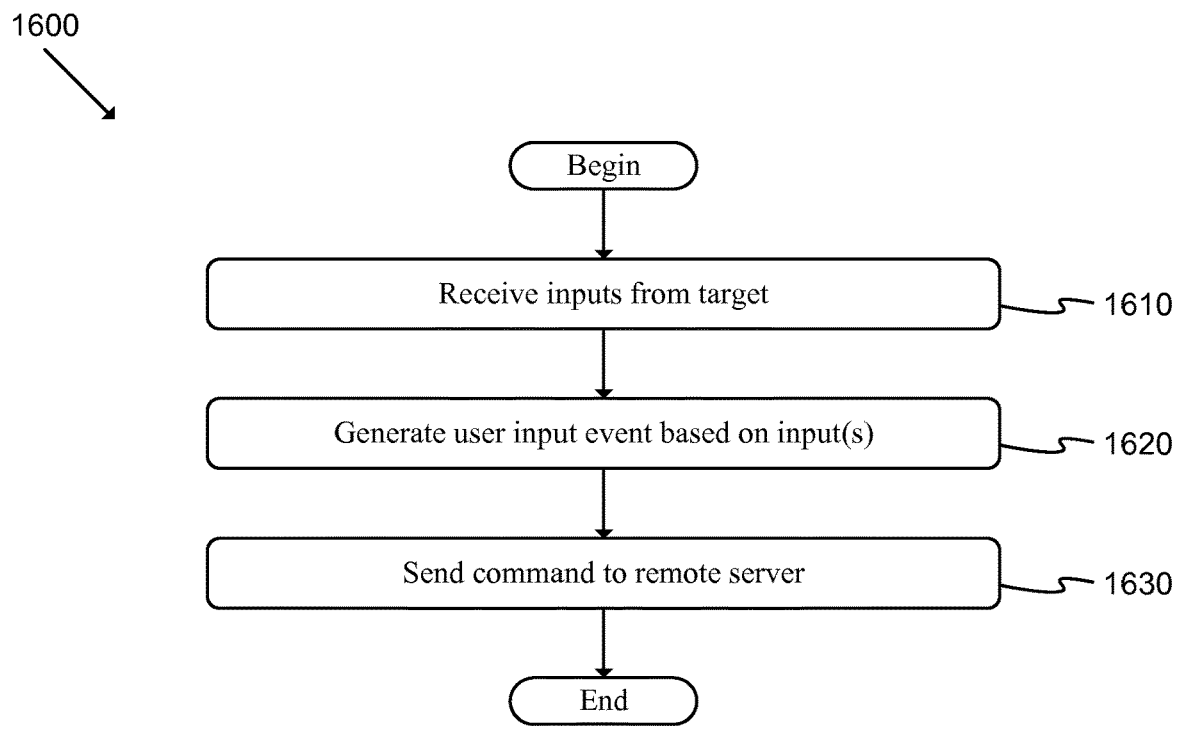
FIG. 16 illustrates a flow chart of a host-side conceptual process used by some embodiments to capture and react to user input events.

FIG. 16 illustrates a flow chart of a host-side conceptual process 1600 used by some embodiments to capture and react to user input events. Such a process may begin, for instance, when an application is launched by a target in some embodiments. As shown, the process may receive (at 1610) user-generated inputs from a target. Such user inputs may be received from a target performing a process such as process 1500 described above.

Next, process 1600 may generate (at 1620) a user input event based at least partly on the received inputs. The user input event may be provided to the currently running application on the host (e.g., by simulating an event on the host), if appropriate.

The process may then generate and send (at 1630) a command to a remote server and then end. In some embodiments, the received inputs may be processed completely by the host and no command may be sent to the remote server (or vice-versa). For example, user input commands may be processed only by the host and sent as user input events to the currently active managed application.

One of ordinary skill in the art will recognize that process 1600 is conceptual in nature and may be implemented in various different ways without departing from the spirit of the invention. For instance, the various operations of process 1600 may be performed in a different order. In addition, various other operations may be performed and/or various operations may be omitted, as appropriate. The process may be performed as part of a larger macro process or divided into multiple sub-processes. Such a process may be performed continuously, at regular intervals, based on satisfaction of a set of conditions, and/or otherwise performed as appropriate.

In addition to the operations described above in reference to FIGS. 15-16, some embodiments may utilize the host, remote server, and/or third-party server(s) to react to inputs received from the target. The host, remote server, and/or third-party server(s) may be able to, separately or conjunctively, process data and/or instructions to perform appropriate actions based on received target inputs. For instance, a user may press a "next" button on a target media player which may cause a command to be sent to a host connected to the target. The host may receive and interpret the command and generate a request and send the request to a remote or third-party server. The remote server may execute some action(s) based on the received request (e.g., retrieving data associated with a next media element in a list) and provide an appropriate response to the host which may, in turn, send updated content to the target based on the received response.

V. Computer System

Many of the processes and modules described above may be implemented as software processes that are specified as one or more sets of instructions recorded on a non-transitory storage medium. When these instructions are executed by one or more computational element(s) (e.g., microprocessors, microcontrollers, Digital Signal Processors (DSPs), Application-Specific ICs (ASICs), Field Programmable Gate Arrays (FPGAs), etc.) the instructions cause the computational element(s) to perform actions specified in the instructions.

Figure 17:
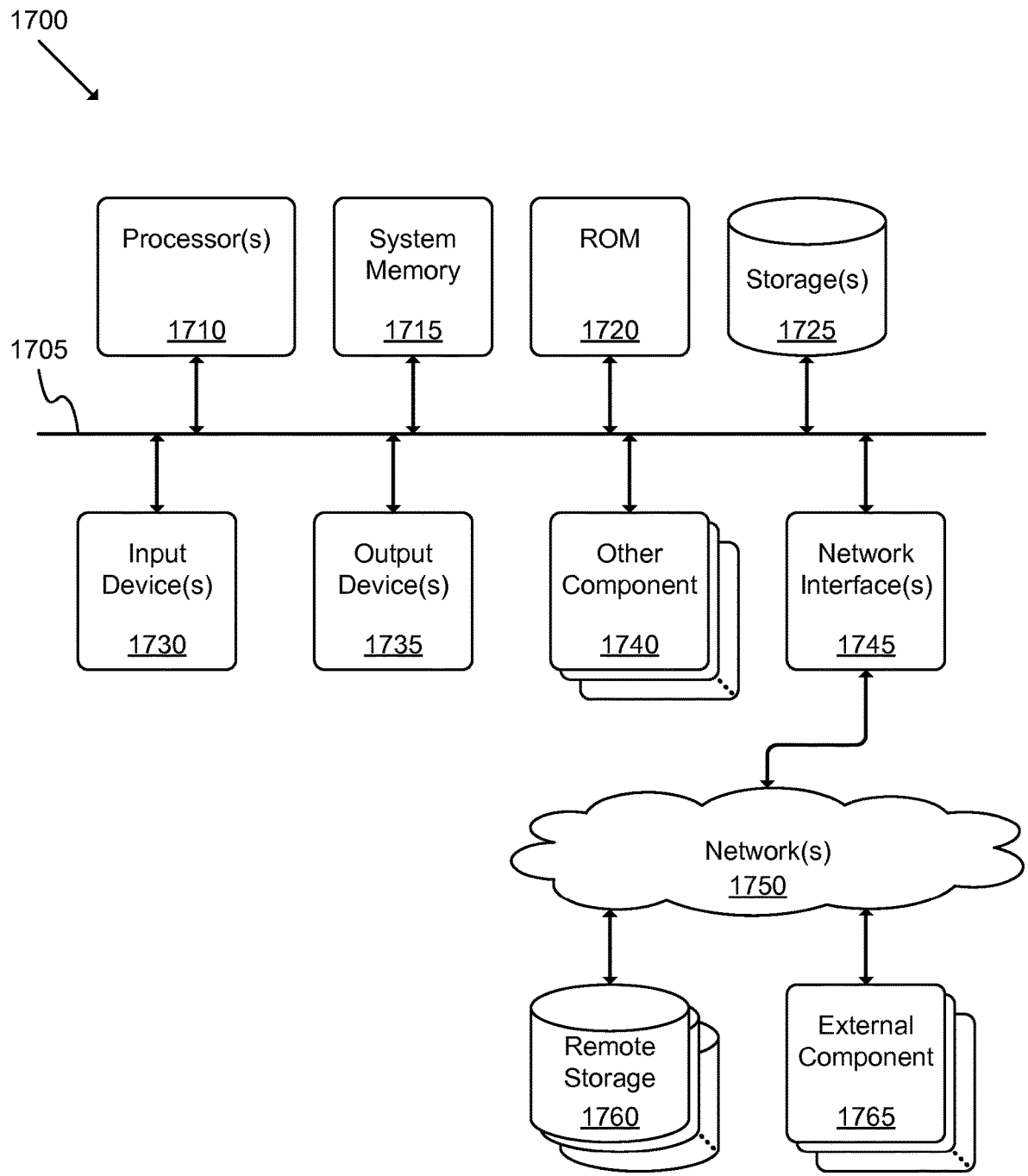
FIG. 17 conceptually illustrates a schematic block diagram of a computer system with which some embodiments of the invention may be implemented.

FIG. 17 conceptually illustrates a schematic block diagram of a computer system 1700 with which some embodiments of the invention may be implemented. For example, the system described above in reference to FIG. 1 may be at least partially implemented using computer system 1700. As another example, the processes described in reference to FIGS. 11-16 may be at least partially implemented using sets of instructions that are executed using computer system 1700.

Computer system 1700 may be implemented using various appropriate devices. For instance, the computer system may be implemented using one or more personal computers ("PC"), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 1700 may include at least one communication bus 1705, one or more processors 1710, a system memory 1715, a read-only memory (ROM) 1720, permanent storage devices 1725, input devices 1730, output devices 1735, various other components 1740 (e.g., a graphics processing unit), and one or more network interfaces 1745.

Bus 1705 represents all communication pathways among the elements of computer system 1700. Such pathways may include wired, wireless, optical, and/or other appropriate communication pathways. For example, input devices 1730 and/or output devices 1735 may be coupled to the system 1700 using a wireless connection protocol or system.

The processor 1710 may, in order to execute the processes of some embodiments, retrieve instructions to execute and/or data to process from components such as system memory 1715, ROM 1720, and permanent storage device 1725. Such instructions and data may be passed over bus 1705.

System memory 1715 may be a volatile read-and-write memory, such as a random access memory (RAM). The system memory may store some of the instructions and data that the processor uses at runtime. The sets of instructions and/or data used to implement some embodiments may be stored in the system memory 1715, the permanent storage device 1725, and/or the read-only memory 1720. ROM 1720 may store static data and instructions that may be used by processor 1710 and/or other elements of the computer system.

Permanent storage device 1725 may be a read-and-write memory device. The permanent storage device may be a non-volatile memory unit that stores instructions and data even when computer system 1700 is off or unpowered. Computer system 1700 may use a removable storage device and/or a remote storage device 1760 as the permanent storage device.

Input devices 1730 may enable a user to communicate information to the computer system and/or manipulate various operations of the system. The input devices may include keyboards, cursor control devices, audio input devices and/or video input devices. Output devices 1735 may include printers, displays, and/or audio devices. Some or all of the input and/or output devices may be wirelessly or optically connected to the computer system.

Other components 1740 may perform various other functions. These functions may include performing specific functions (e.g., graphics processing, sound processing, etc.), providing storage, interfacing with external systems or components, etc.

Finally, as shown in FIG. 17, computer system 1700 may be coupled to one or more networks 1750 through one or more network interfaces 1745. For example, computer system 1700 may be coupled to a web server on the Internet such that a web browser executing on computer system 1700 may interact with the web server as a user interacts with an interface that operates in the web browser. Computer system 1700 may be able to access one or more remote storages 1760 and one or more external components 1765 through the network interface 1745 and network 1750. The network interface(s) 1745 may include one or more application programming interfaces (APIs) that may allow the computer system 1700 to access remote systems and/or storages and also may allow remote systems and/or storages to access computer system 1700 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 1700 may be used in conjunction with the invention. Moreover, one of ordinary skill in the art will appreciate that many other system configurations may also be used in conjunction with the invention or components of the invention.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

It should be understood, of course, that the foregoing relates to illustrative details of exemplary embodiments of the invention and that modifications may be made without departing from the spirit and scope of the invention as defined by the following claims.

I claim:

1. An automated method that provides multimedia content to a target canvas, the automated method comprising:
    establishing a communication link from a host mobile device to an external system associated with the target canvas;
    rendering, at the host mobile device, multimedia content for playback by the target canvas, wherein the multimedia content is rendered off screen into screen buffers comprising sets of vector commands to be transferred to and displayed by the target canvas based at least partly on a resolution of the target canvas, wherein the rendering comprises drawing individual graphical user interface elements and content of each screen of the multimedia content to an off-screen canvas having a same resolution as the resolution of the target canvas, wherein the off-screen canvas is converted into the sets of vector commands by capturing vector information associated with scaled and calculated hypertext markup language (HTML) pages and constructing a vector description at the host mobile device by transforming the captured vector information based at least partly on the resolution of the target canvas;
    encoding the screen buffers into host command messages, each host command message comprising a particular encoded screen buffer; and
    sending the host command messages from the host mobile device to the external system over the communication link.

2. The automated method of claim 1 further comprising:
    rendering the multimedia content for playback by an alternative target canvas of the external system; and
    sending the rendered host commands to the alternative target canvas over the communication link.

3. The automated method of claim 1, wherein rendering multimedia content for playback by the target canvas comprises:
    determining a bandwidth across the communication link;
    determining a main application rendering rate; and
    encoding the multimedia content based at least partly on at least one of the bandwidth and the main application rendering rate.

4. The automated method of claim 1, wherein the external system is a vehicle display unit or a medical device.

5. The automated method of claim 1 further comprising:
    receiving a user input action from the external system across the communication link;
    converting the user input action into a client command;
    sending the client command across the communication link;
    receiving the client command at the host mobile device;
    processing the client command into a user action;
    providing the user action to an application running on the host mobile device;
    generating an output of the application running on the host mobile device; and
    modifying the rendered multimedia content based at least partly on the output of the application running on the host mobile device.

6. A mobile device that executes web-based applications in a web browser associated with an external system, the mobile device comprising:
    a processor for executing sets of instructions and
    a non-transitory medium that stores the sets of instructions, wherein the sets of instruction comprise:
        establishing a communication link between the mobile device and the external system;
        accessing, at the mobile device, a particular web-based application;
        rendering, off-screen at the mobile device, a user interface associated with the particular web-based application, wherein the rendering comprises generating screen buffers comprising sets of vector commands using a web browser running on the mobile device at an appropriate resolution for the external system by capturing vector information associated with scaled and calculated hypertext markup language (HTML) pages and constructing a vector description at the host mobile device by transforming the captured vector information based at least partly on a resolution of a display associated with the external system;
        encoding the screen buffers into host command messages; and
        sending the host command messages to the external system for display.

7. The mobile device of claim 6, wherein the sets of instructions further comprise:
    receiving a user input action from the external system;
    converting the user input action into a client command;
    sending the client command across the communication link;
    receiving the client command at a host mobile device;
    processing the client command into a user action; and
    providing the user action to the particular web-based application at the host mobile device.

8. The mobile device of claim 6, wherein the communication link with the external system comprises a wireless connection.

9. The mobile device of claim 6, wherein the external system is a vehicle display unit and wherein the mobile device is a smartphone.

10. The mobile device of claim 6, wherein the particular web-based application is accessed via at least one cellular communication network.

11. A system that provides multimedia content to a user, the system comprising:
    a target comprising a target display that displays multimedia content; and
    a host that generates multimedia content for display by the target by rendering the multimedia content based at least partly on a resolution of the target display, wherein:
        the multimedia content is rendered, at the host, into a plurality of screen buffers, each screen buffer including a set of vector commands by capturing vector information associated with scaled and calculated hypertext markup language (HTML) pages and constructing a vector description at the host by transforming the captured vector information based at least partly on a resolution of the target display, the screen buffers are encoded into host command messages, the host command messages are sent from the host to the target over a communication link, and the target interacts with the host across the communication link to at least partially control the display of multimedia content.

12. The system of claim 11, wherein the host is a mobile device and the target is a vehicle display unit.

13. The system of claim 11 further comprising a remote server that interacts with the host to at least partially control the display of multimedia content, wherein the host and the remote server communicate across at least one wireless connection.

14. The system of claim 11, wherein the host and the target communicate across at least one wireless connection.

15. The automated method of claim 1 further comprising:
receiving, at the external system, the host commands sent from the host mobile device; and
processing the rendered content included in the host commands and displaying the rendered content to the target canvas.

16. The mobile device of claim 6, wherein the sets of instructions further comprise:
establishing a communication link between the mobile device and a remote server; and
accessing, at the mobile device, the particular web-based application via the remote server.

17. The system of claim 13, wherein the target comprises at least one user interface element and wherein:
user input actions are received via the at least one user interface element,
user input actions are converted into client commands,
client commands are sent across the communication link and received at the host,
client commands are processed into user actions, and
user actions are provided to the particular web-based application at the remote server.

18. The automated method of claim 1, wherein the sets of vector commands comprise a fill rectangle command associated with a full screen bitmap.

19. The mobile device of claim 6, wherein the sets of vector commands comprise a fill rectangle command associated with a full screen bitmap.

20. The system of claim 11, wherein the set of vector commands comprises a fill rectangle command associated with a full screen bitmap.

* * * * *